(12) United States Patent
Regnier et al.

(10) Patent No.: US 10,895,703 B2
(45) Date of Patent: Jan. 19, 2021

(54) CONNECTOR SYSTEM WITH AIR FLOW AND FLANGES

(71) Applicant: Molex, LLC, Lisle, IL (US)

(72) Inventors: Kent E. Regnier, Lombard, IL (US); Jerry D. Kachlic, Shanghai (CN)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 16/773,990

(22) Filed: Jan. 28, 2020

(65) Prior Publication Data

US 2020/0158968 A1 May 21, 2020

Related U.S. Application Data

(63) Continuation of application No. 14/392,284, filed as application No. PCT/US2015/000469 on Dec. 23, 2015, now Pat. No. 10,551,580.

(60) Provisional application No. 62/096,054, filed on Dec. 23, 2014, provisional application No. 62/206,598, filed on Aug. 18, 2015.

(51) Int. Cl.
*G02B 6/42* (2006.01)
*G02B 6/38* (2006.01)
*H01R 13/659* (2011.01)

(52) U.S. Cl.
CPC ......... *G02B 6/4269* (2013.01); *G02B 6/3879* (2013.01); *G02B 6/3885* (2013.01); *G02B 6/3897* (2013.01); *G02B 6/428* (2013.01); *G02B 6/4278* (2013.01); *G02B 6/4292* (2013.01); *G02B 6/3867* (2013.01); *H01R 13/659* (2013.01)

(58) Field of Classification Search
CPC .. G02B 6/4269; G02B 6/4292; G02B 6/4278; G02B 6/3879; G02B 6/3885; G02B 6/428; G02B 6/3897; G02B 6/3867; H01R 13/659
See application file for complete search history.

(56) References Cited

U.S. PATENT DOCUMENTS

| | | | |
|---|---|---|---|
| 6,796,831 B1 | 9/2004 | Yasufuku et al. |
| 6,816,376 B2 | 11/2004 | Bright et al. |
| 7,764,504 B2 | 7/2010 | Phillips et al. |
| 8,469,744 B2 | 6/2013 | Nichols et al. |
| 8,613,632 B1 | 12/2013 | Nichols |
| 8,823,540 B2 | 9/2014 | Scholeno |

(Continued)

FOREIGN PATENT DOCUMENTS

| | | |
|---|---|---|
| JP | 3187861 U | 12/2013 |
| TW | M453284 U | 5/2013 |

OTHER PUBLICATIONS

Non-Final rejection received for U.S. Appl. No. 14/392,284, dated Nov. 16, 2017, 29 pages.

(Continued)

*Primary Examiner* — Andrew Jordan

(57) ABSTRACT

A receptacle includes a cooling channel that is positioned between a top port and a bottom port. A transfer member is positioned in the cooling channel and is configured to direct heat from an inserted plug module into the cooling channel. Air flowing through the cooling channel acts to remove thermal energy from the receptacle. A connector system may include a plug module that can be inserted into such a receptacle and the plug module can include grooves to help allow for direct cooling of the plug module, even when inserted into the receptacle.

11 Claims, 34 Drawing Sheets

(56) References Cited

U.S. PATENT DOCUMENTS

| | | |
|---|---|---|
| 9,052,473 B2 | 6/2015 | Schmelz et al. |
| 9,389,368 B1 | 7/2016 | Sharf |
| 9,518,785 B2 | 12/2016 | Szczesny |
| 9,531,117 B1 | 12/2016 | Yang |
| 9,620,906 B1 | 4/2017 | Briant et al. |
| 9,668,378 B2 | 5/2017 | Phillips |
| 9,793,648 B2 | 10/2017 | Regnier et al. |
| 9,877,413 B2 | 1/2018 | Regnier |
| 9,882,297 B2 | 1/2018 | Regnier |
| 9,960,525 B2 | 5/2018 | Regnier et al. |
| 10,551,580 B2 | 2/2020 | Regnier et al. |
| 2003/0161108 A1 | 8/2003 | Bright et al. |
| 2012/0058670 A1 | 3/2012 | Regnier et al. |
| 2012/0099275 A1 | 4/2012 | Regnier |
| 2012/0196477 A1 | 8/2012 | Nichols et al. |
| 2012/0264330 A1 | 10/2012 | Banakis et al. |
| 2013/0114211 A1 | 5/2013 | Regnier |
| 2013/0164970 A1 | 6/2013 | Regnier et al. |
| 2013/0344745 A1 | 12/2013 | Nichols |
| 2015/0029667 A1 | 1/2015 | Szczesny |
| 2016/0197424 A1 | 7/2016 | L'Esperance et al. |
| 2017/0285282 A1 | 10/2017 | Regnier et al. |
| 2018/0146576 A1 | 5/2018 | Regnier |
| 2020/0158968 A1* | 5/2020 | Regnier ............... G02B 6/3879 |

OTHER PUBLICATIONS

Final rejection received for U.S. Appl. No. 14/392,284, dated Jun. 4, 2018, 31 pages.

* cited by examiner

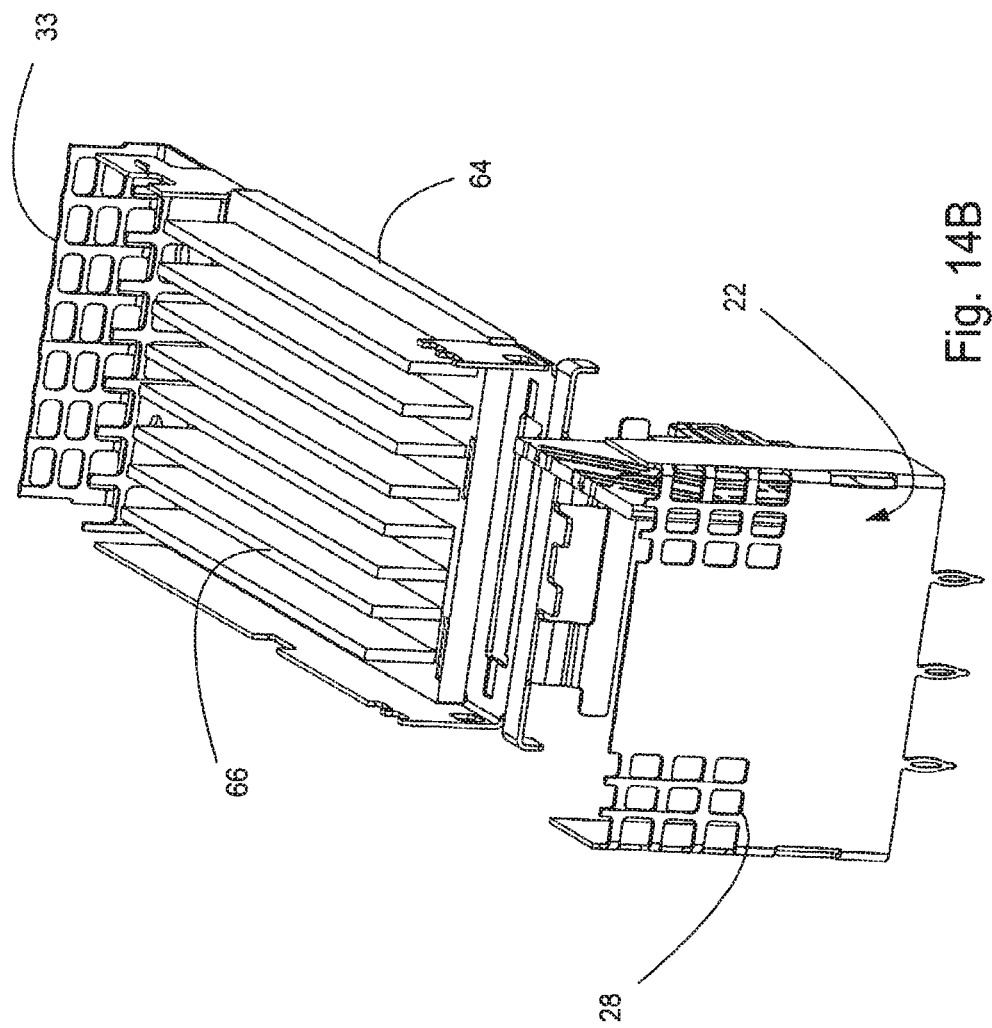

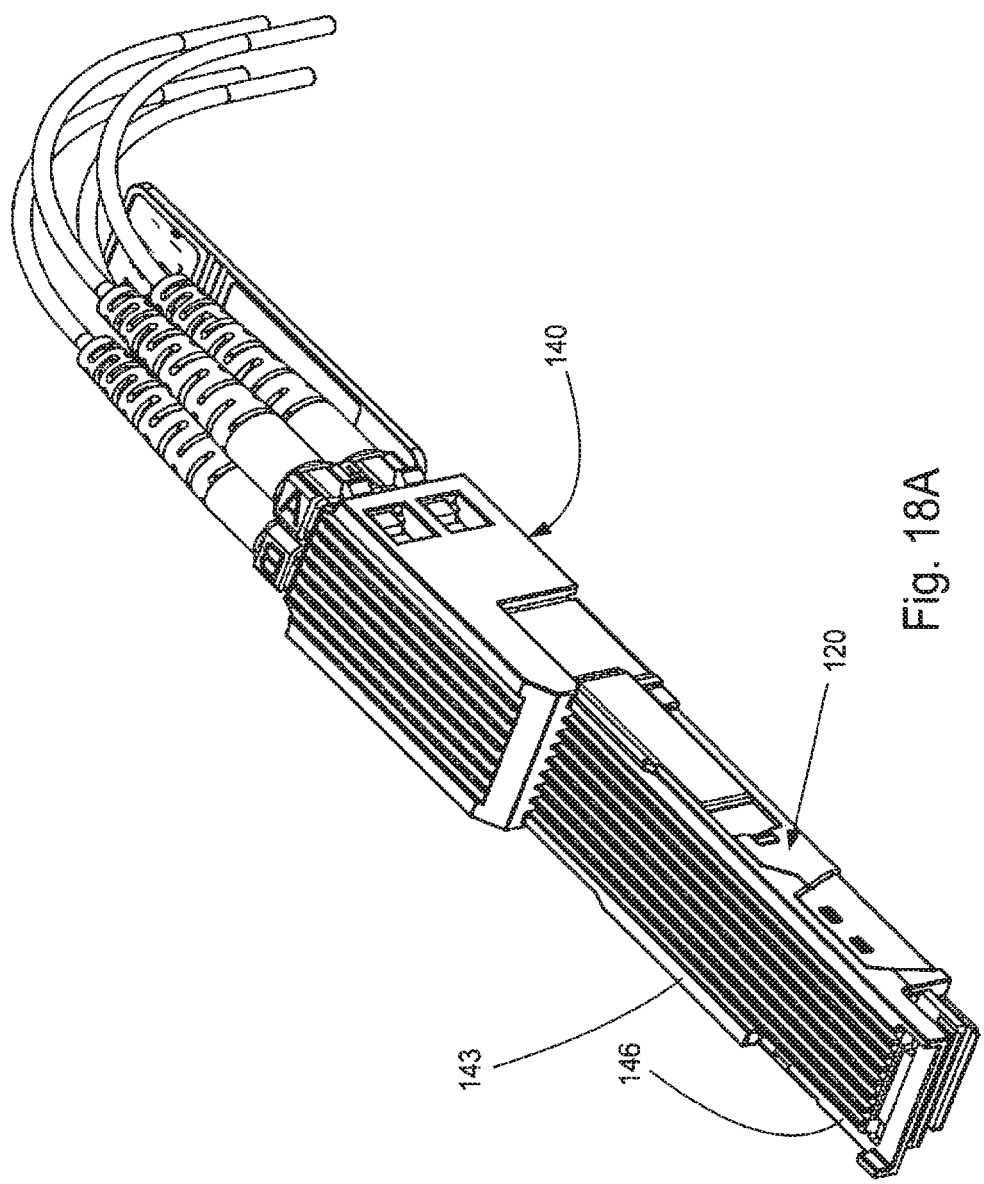

CONNECTOR SYSTEM WITH AIR FLOW AND FLANGES

RELATED APPLICATIONS

This application claims priority to U.S. application Ser. No. 14/392,284, filed Dec. 23, 2015, which is a national phase of PCT Application No. PCT/US2015/000469, filed Dec. 23, 2015, which in turn claims priority to U.S. Provisional Application Ser. No. 62/096,054, filed Dec. 23, 2014 and 62/206,598, filed Aug. 18, 2015, all of which are incorporated herein by reference in their entirety.

TECHNICAL FIELD

This disclosure relates to the field of connectors, more particularly to the field of connectors that need to manage thermal energy due to active components.

DESCRIPTION OF RELATED ART

Stacked IO connectors are known. These connectors range from relatively low speed connectors such as USB style connector to high performance connectors such as QSFP connectors that can function at data rates of up to 25 Gbps per channel. As is known, for lower data rates the signal frequency generally is less than 5 Ghz and conventional copper cables are well suited to handle lengths of up to 10 meters. As signaling frequencies increase, however, convention passive copper cables become less suitable.

As a result it is more common for cable assemblies to include active components that can either convert the signals (such as would be useful for optical modules) or amplify the signal (such as would be useful for active copper cables). In either case, the use of active components generates thermal energy that must be managed in order of a system to function properly. In the past, the thermal energy was often managed by using a single row of receptacles. Thus, systems could include a ganged connector configuration but would not include a stacked configuration. As can be appreciated, however, such a limitation limits the number of ports that can be provided and therefore makes it more difficult for the various server and communication racks to provide the density of ports that is needed to meet next generation requirements for communication bandwidth. Consequentially, certain individuals would appreciate further improvements in thermal performance in a system that can support high data rates while still managing significant thermal energy requirements.

SUMMARY

A connector system includes a receptacle and a plug module. The receptacle a top port and a bottom port and includes a cooling channel positioned between the top and bottom ports. The receptacle is configured to allow air to flow between a front face and another face of the receptacle through the cooling channel so as to provide a way to transfer thermal energy away from the cooling channel. The cooling channel can include a transfer member that includes fins to help dissipate thermal energy into the air flowing through the receptacle The plug module includes a body with main portion and a mating portion that is smaller than the main portion. The mating portion is configured to be inserted into a receptacle port. The mating portion includes ribs on a top surface that allow, when the plug is inserted into a receptacle, air to flow along the mating portion and directly cool the plug module.

BRIEF DESCRIPTION OF THE DRAWINGS

The present invention is illustrated by way of example and not limited in the accompanying figures in which like reference numerals indicate similar elements and in which:

FIG. 14B illustrates another perspective view of the embodiment depicted in FIG. 14A.

FIG. 18A illustrates a perspective view of an embodiment of a plug module configured for use with optical fibers.

DETAILED DESCRIPTION

Figure 1:
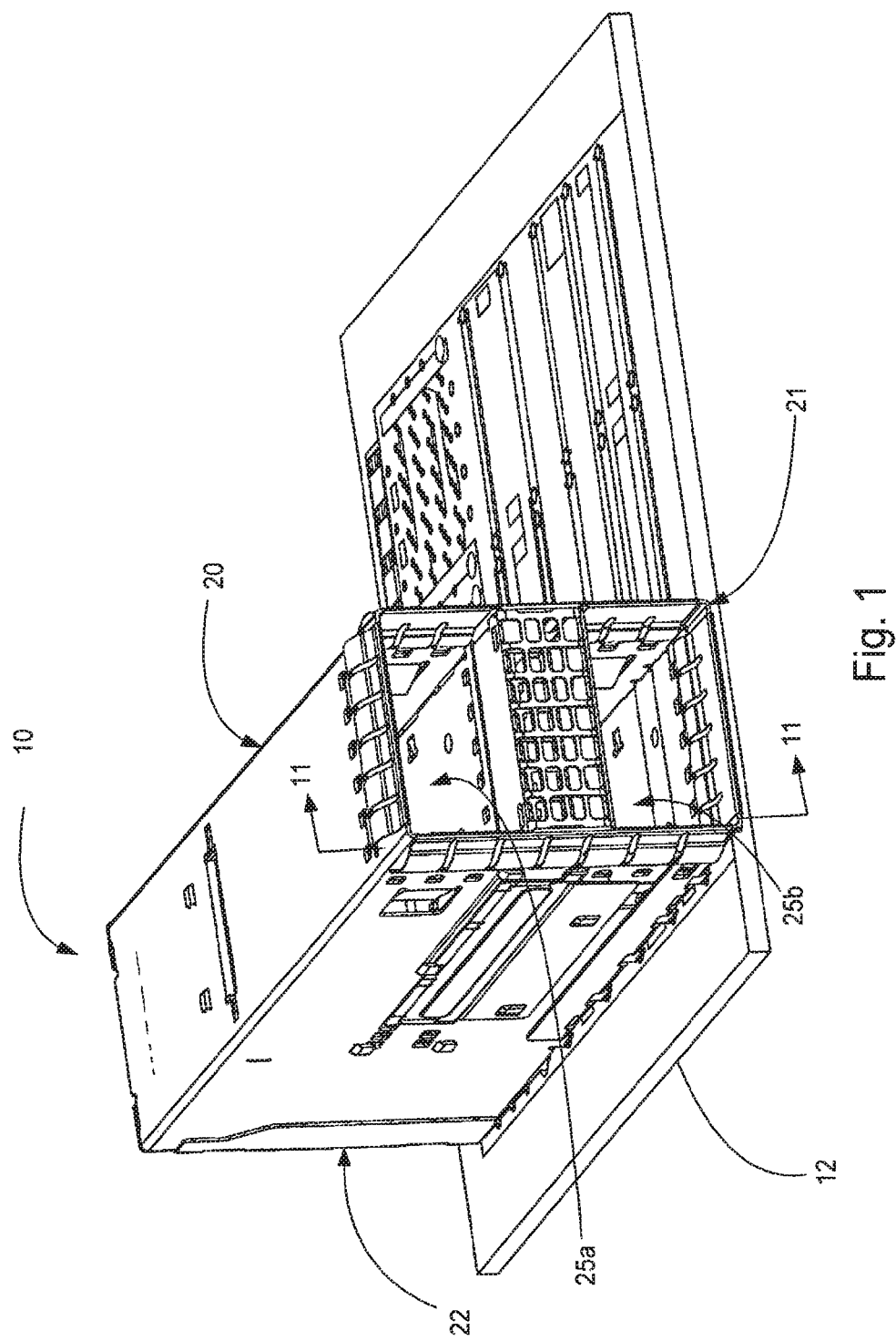
FIG. 1 illustrates a perspective view of an embodiment of a connector mounted on a circuit board.
Figure 2:
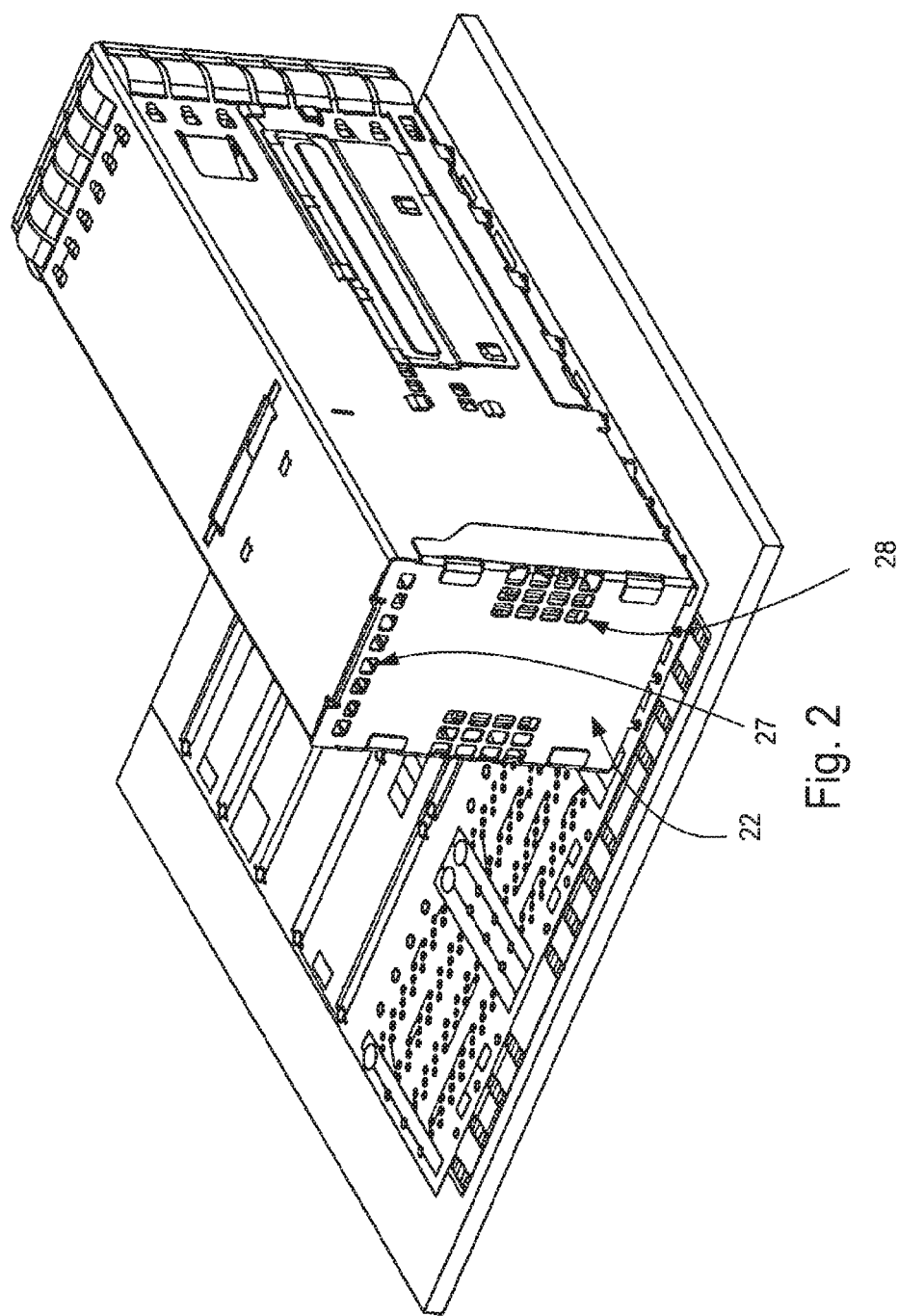
FIG. 2 illustrates another perspective view of the embodiment depicted in FIG. 1.
Figure 3:
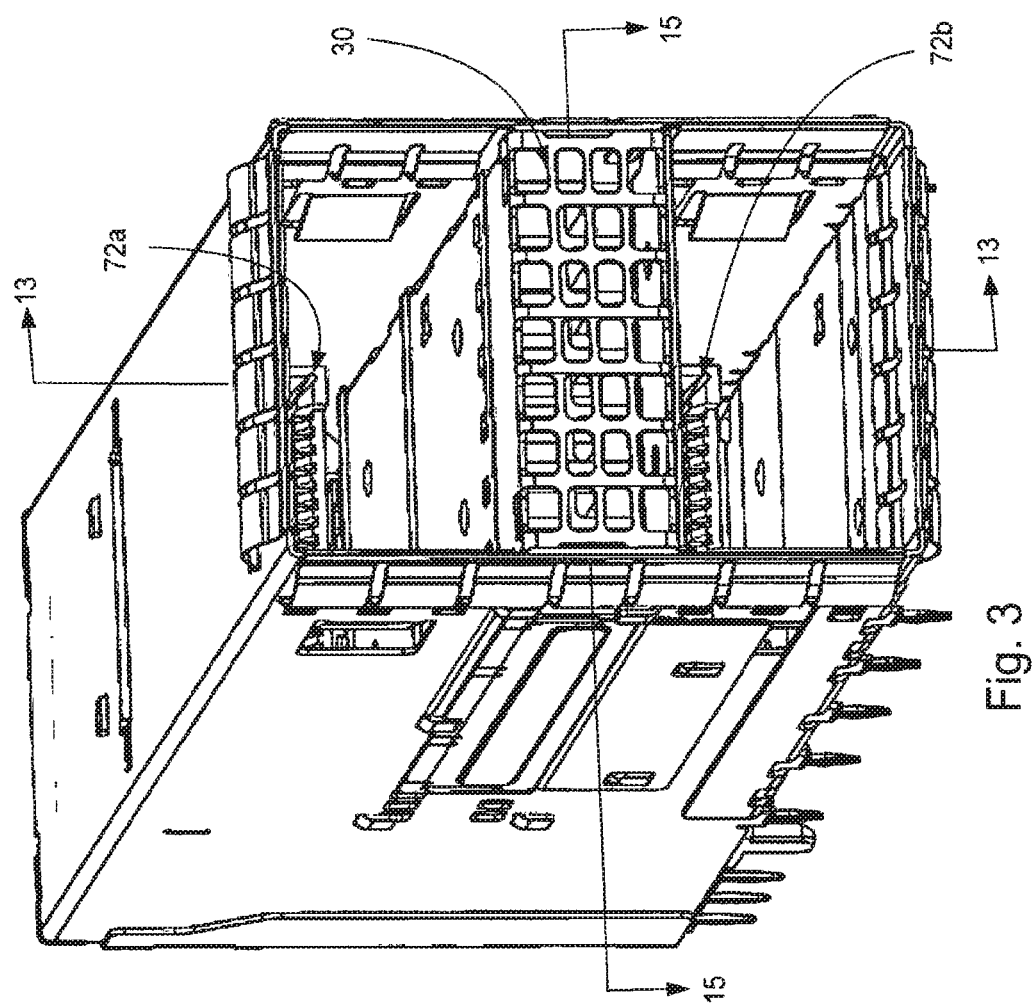
FIG. 3 illustrates a simplified perspective view of the embodiment depicted in FIG. 1 with the circuit board removed.
Figure 4:
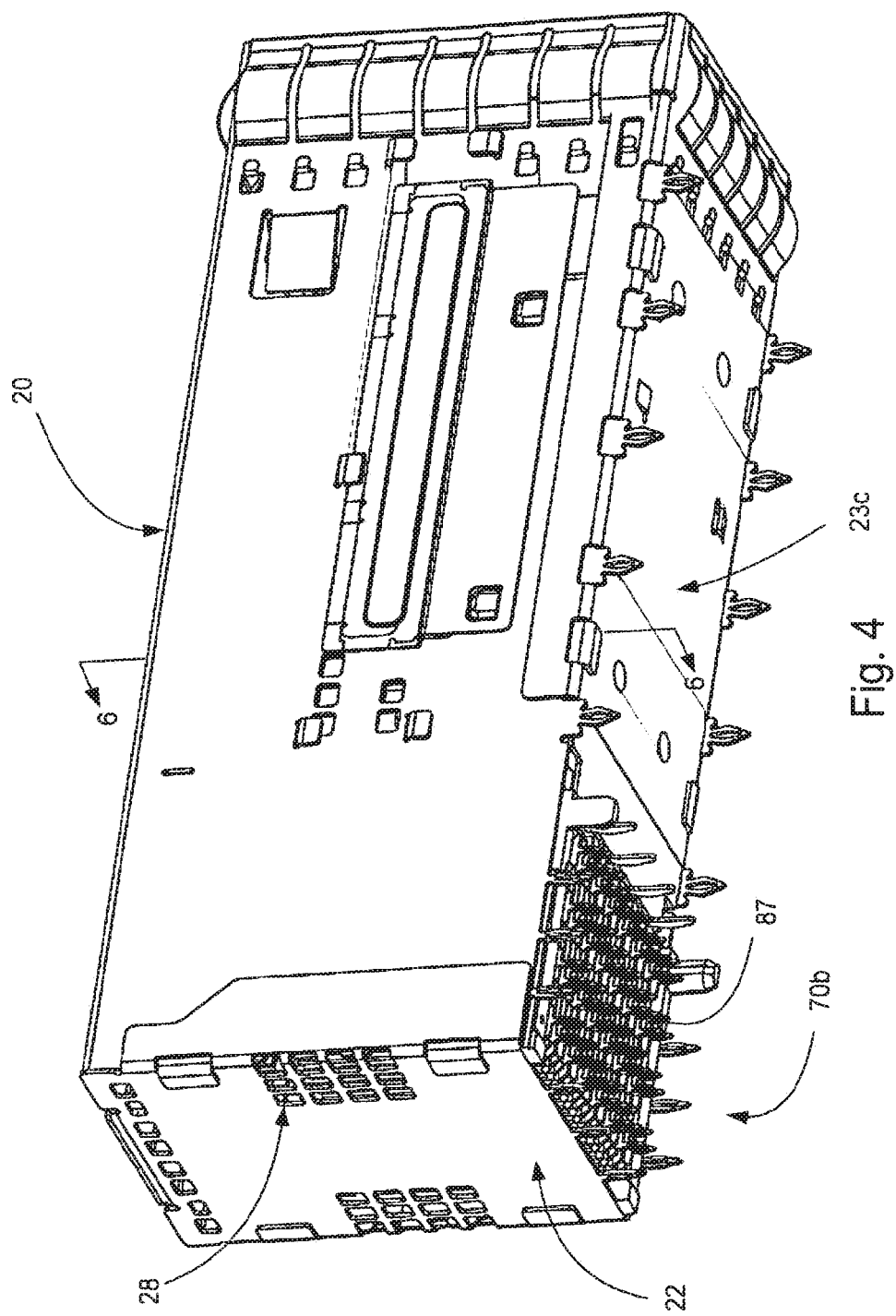
FIG. 4 illustrates another perspective view of the embodiment depicted in FIG. 3.
Figure 5:
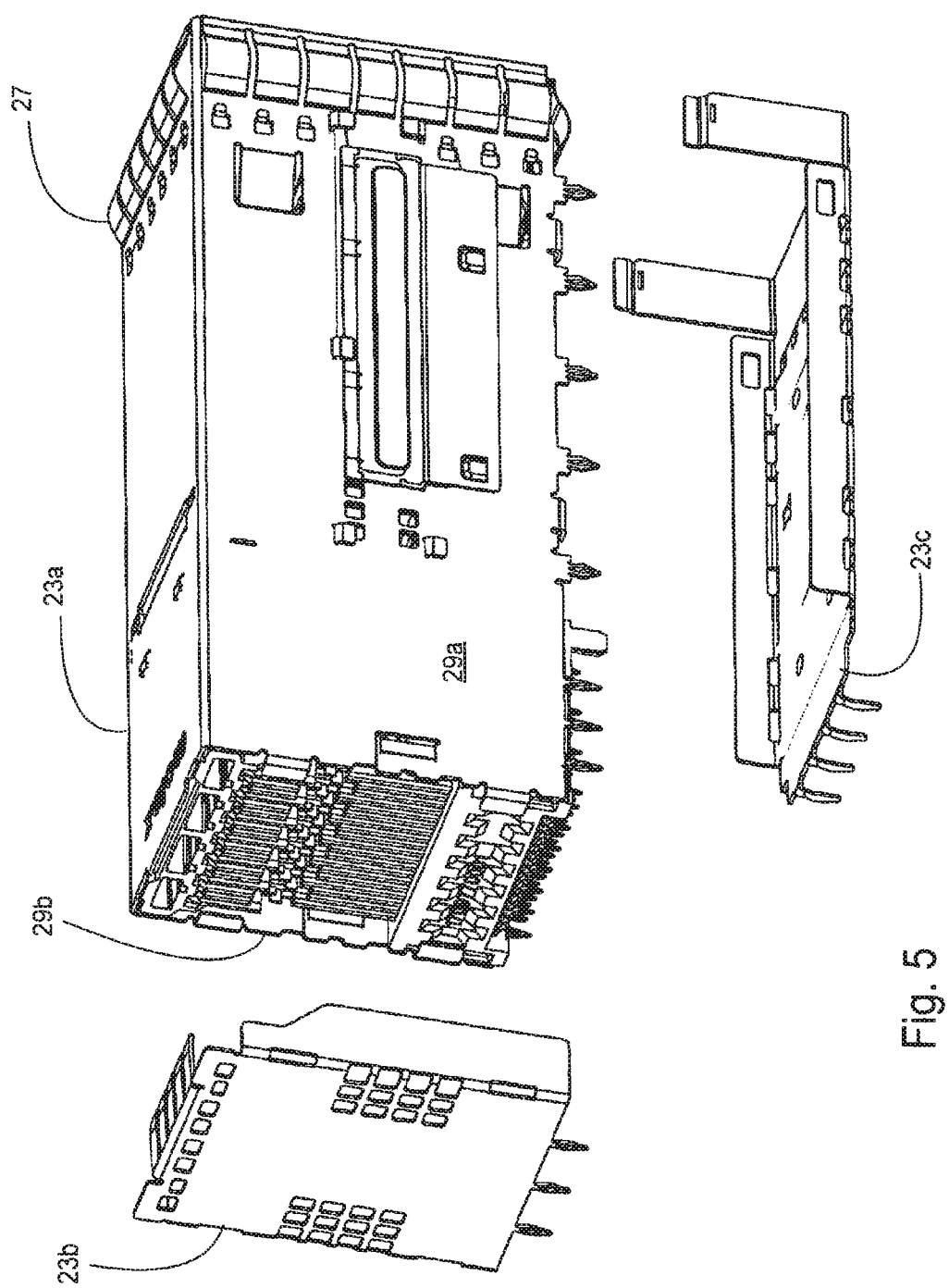
FIG. 5 illustrates a partially exploded perspective view of the embodiment depicted in FIG. 4.
Figure 6:
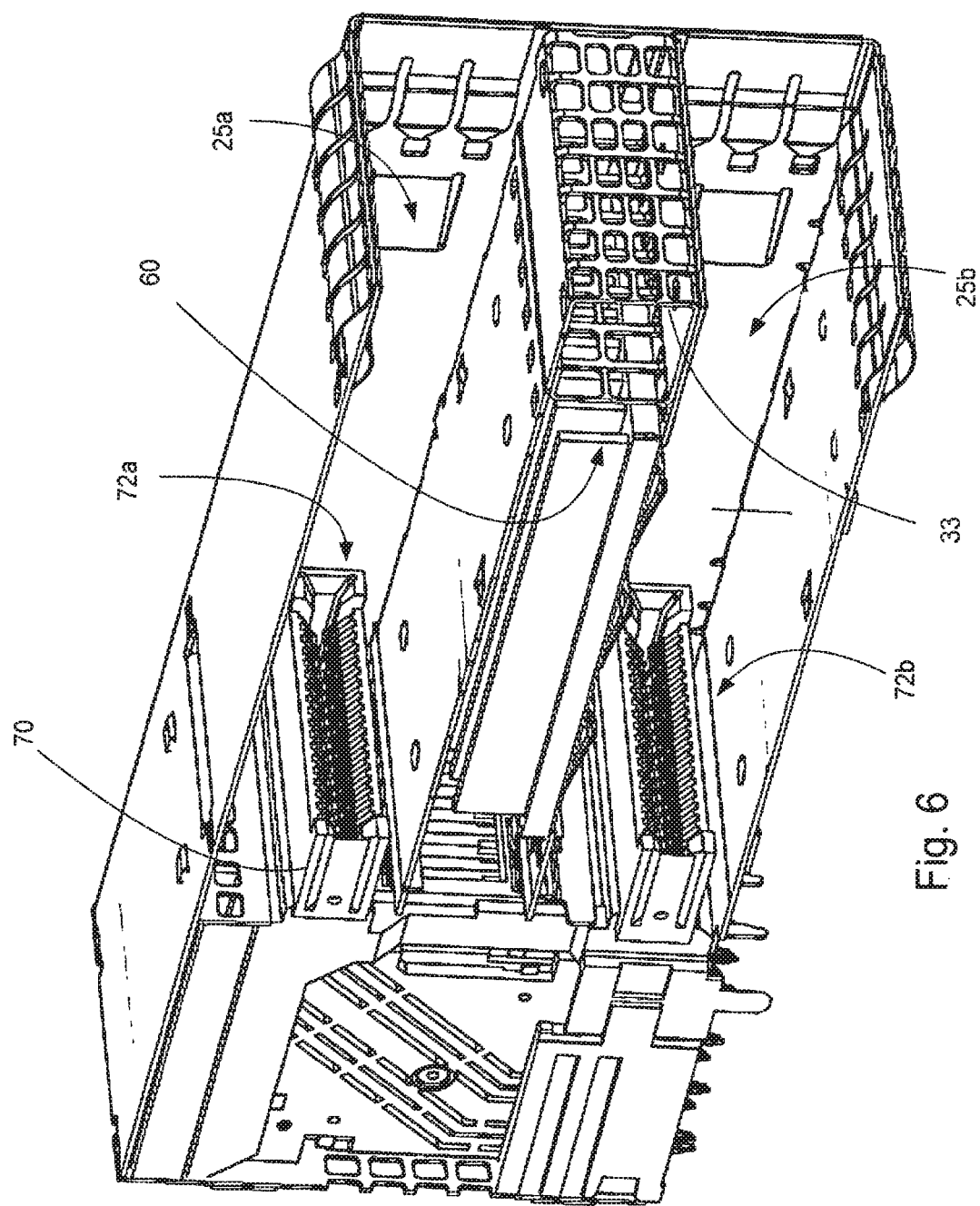
FIG. 6 illustrates a perspective cross sectional view of the embodiment depicted in FIG. 4, taken along line 6-6.
Figure 7:
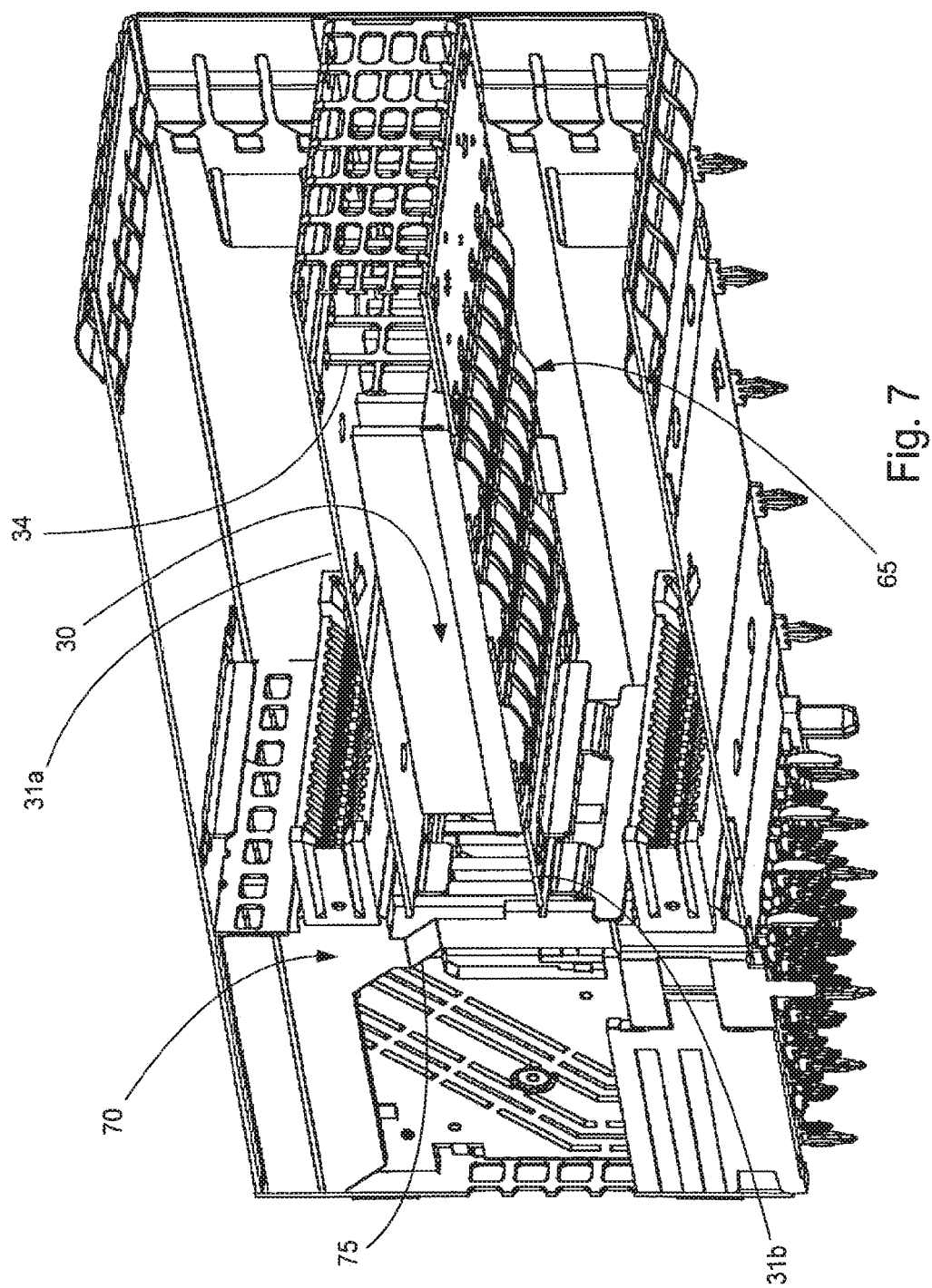
FIG. 7 illustrates another perspective view of the embodiment depicted in FIG. 6.
Figure 8:
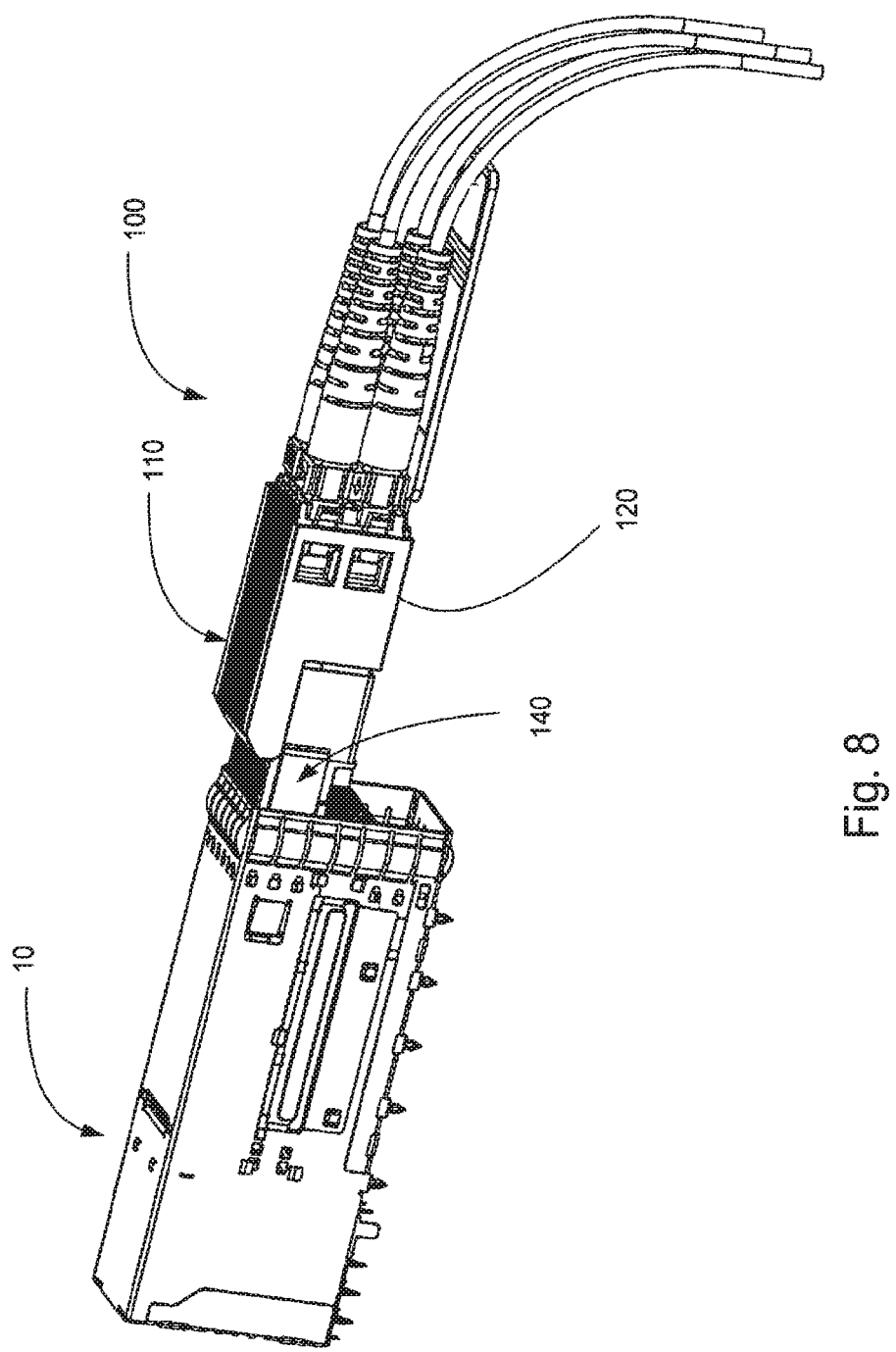
FIG. 8 illustrates a perspective view of an embodiment of a connector system with a plug module in a top port.
Figure 9:
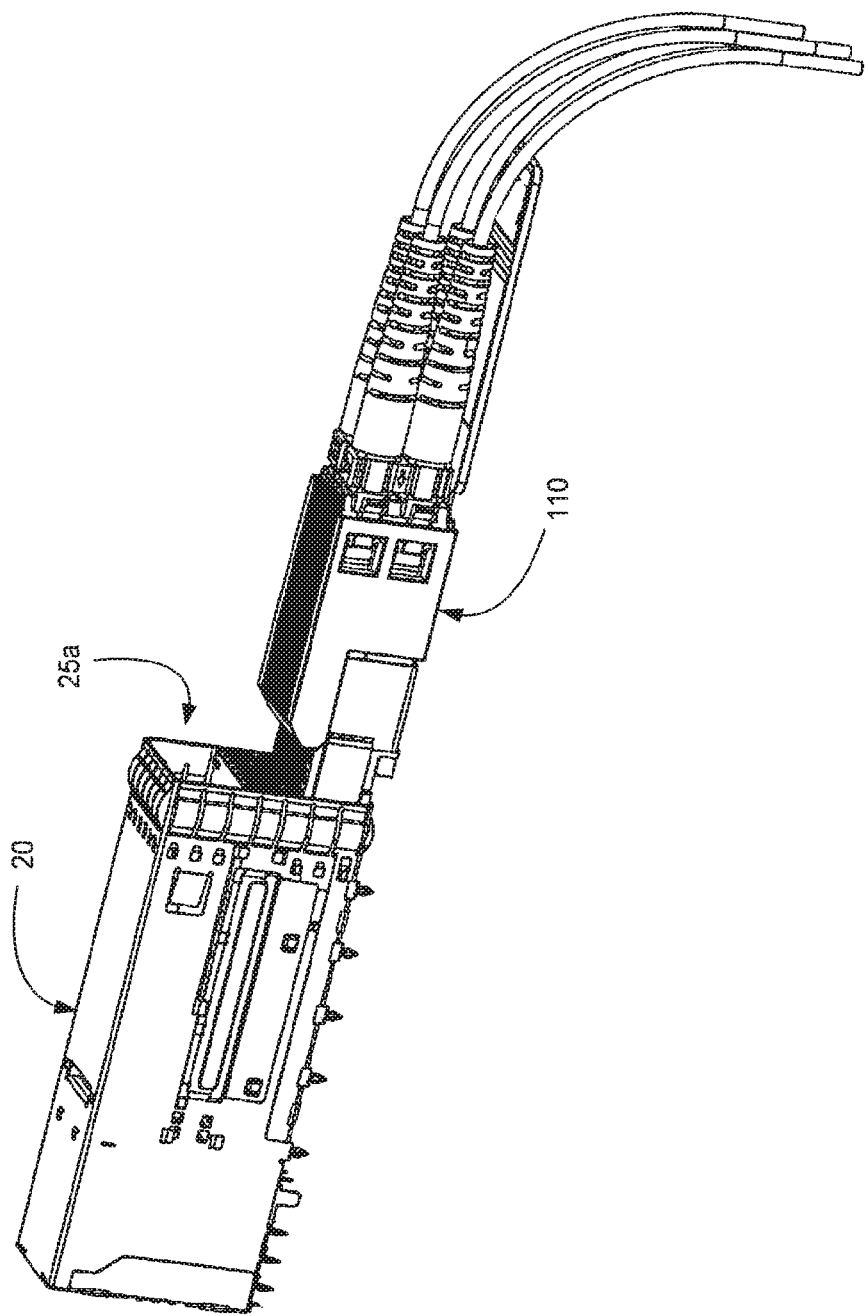
FIG. 9 illustrates a perspective view of the embodiment depicted in FIG. 8 but with the plug module in a bottom port.
Figure 10:
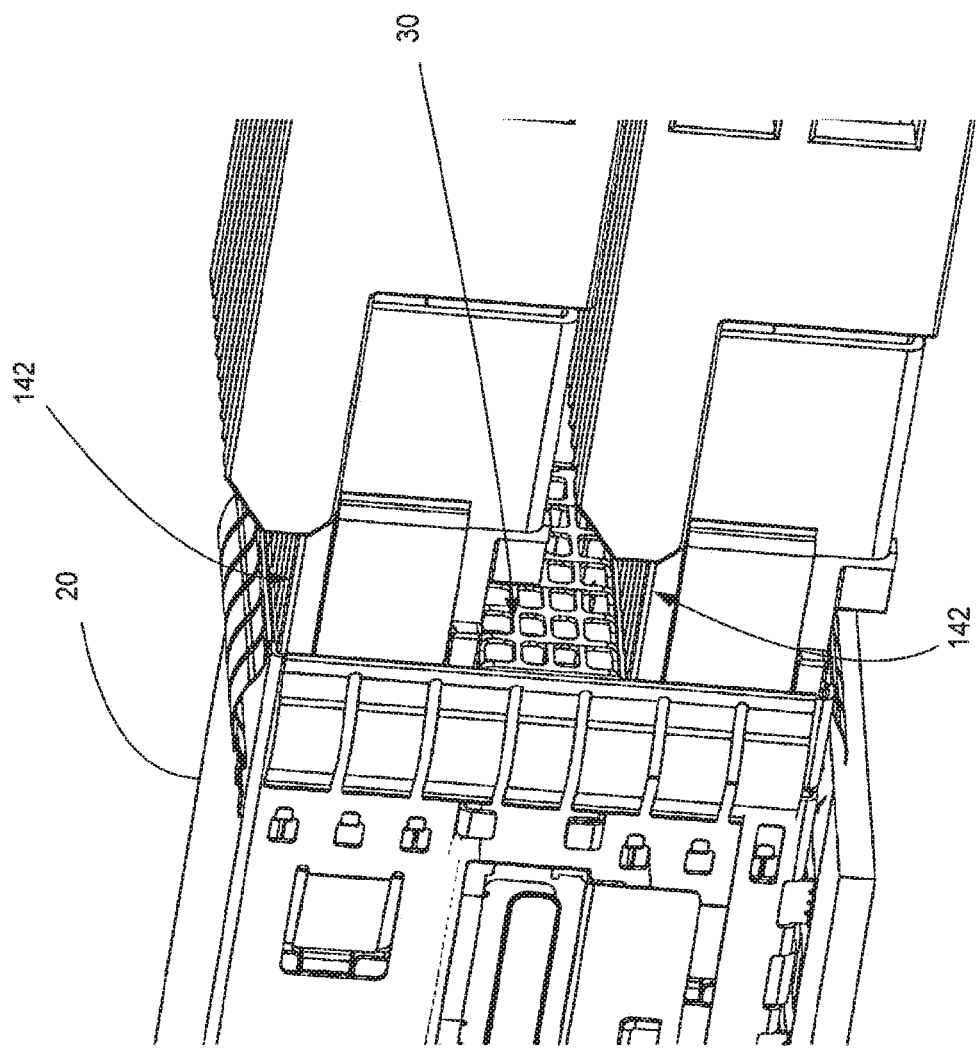
FIG. 10 illustrates an enlarged perspective view of an embodiment with two plug modules engaging a receptacle.
Figure 11:
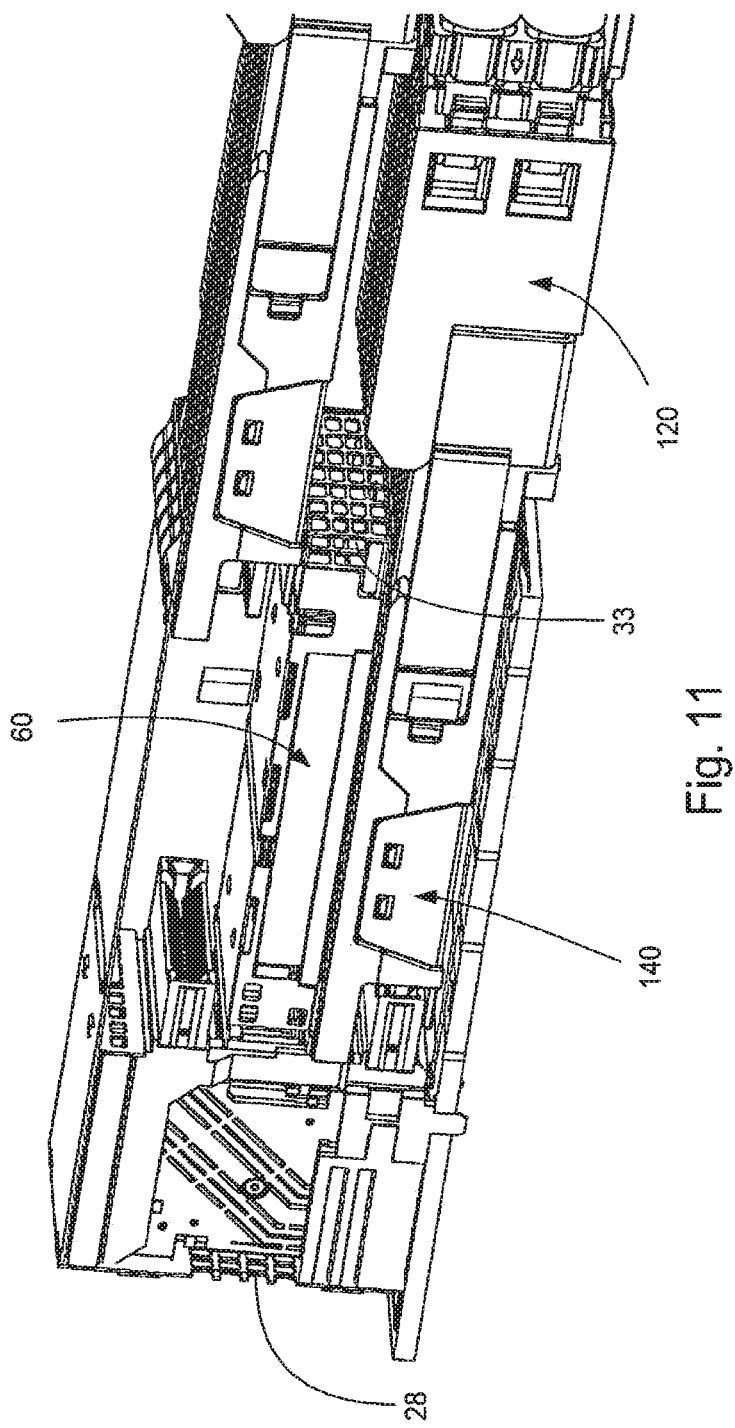
FIG. 11 illustrates a perspective cross sectional view of the embodiment depicted in FIG. 1, taken along line 11-11 with two plug modules.
Figure 12:
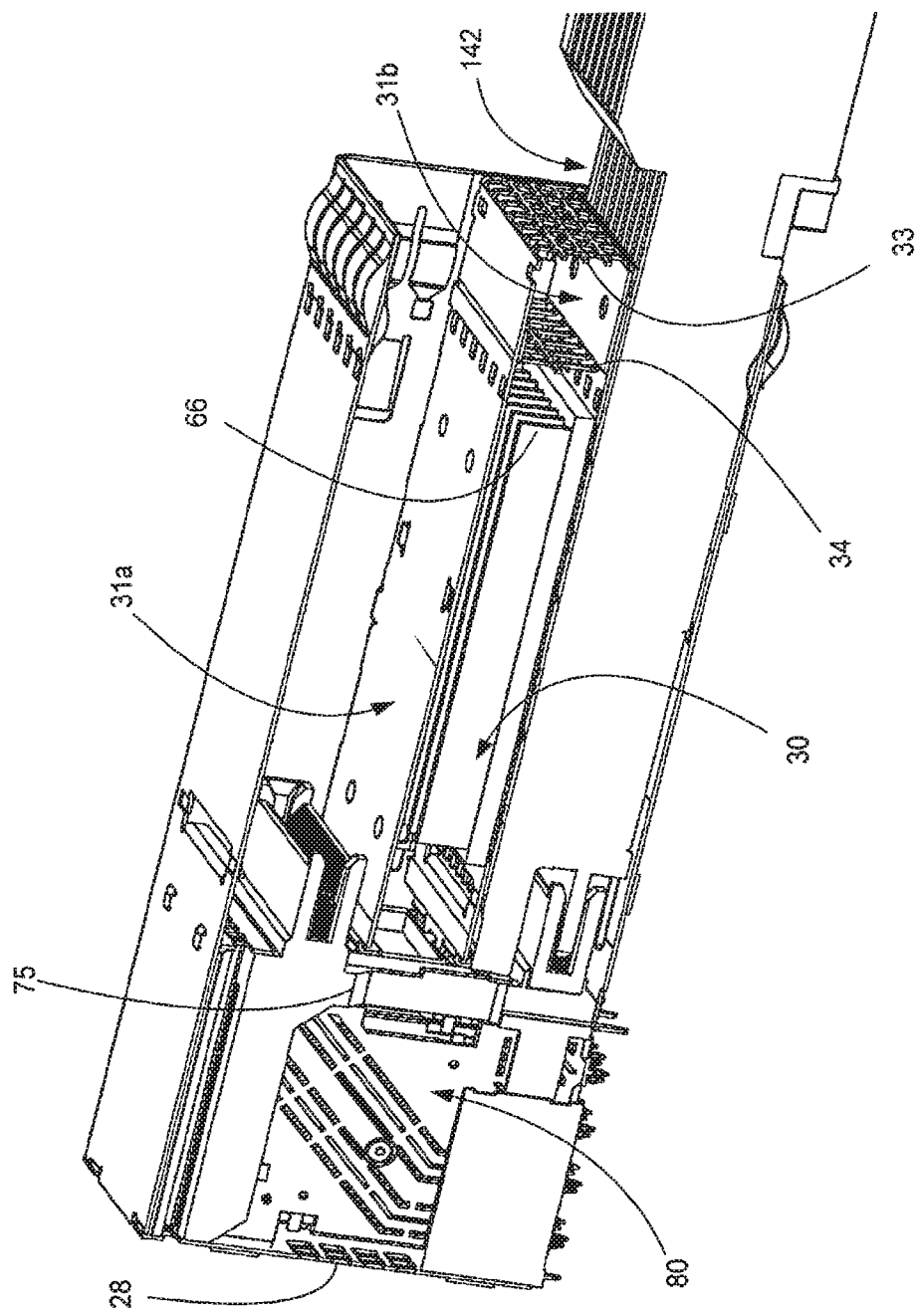
FIG. 12 illustrates a perspective simplified view of the embodiment depicted in FIG. 11.
Figure 13:
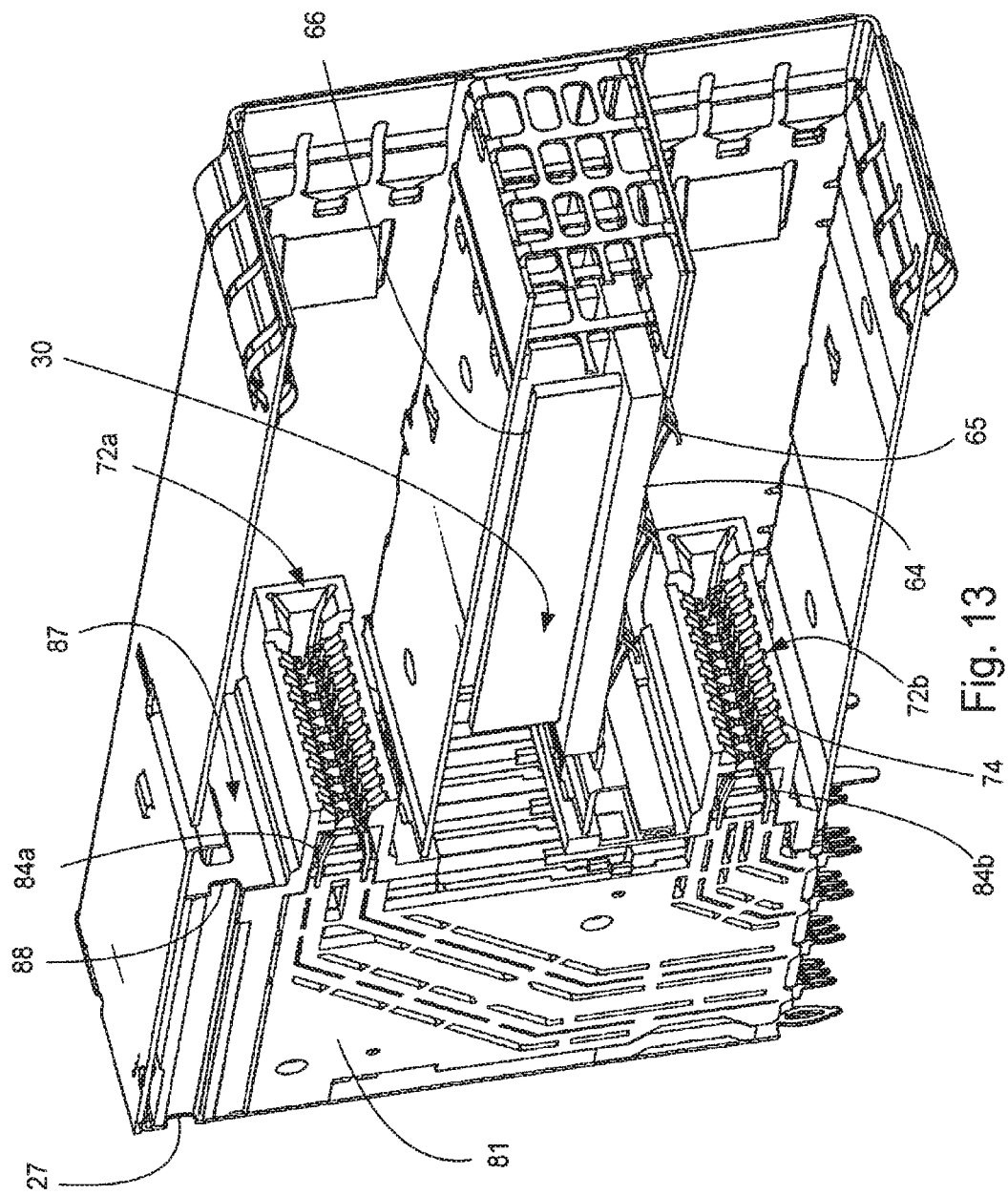
FIG. 13 illustrates a perspective cross sectional view of the embodiment depicted in FIG. 3, taken along line 13-13.
Figure 14A:
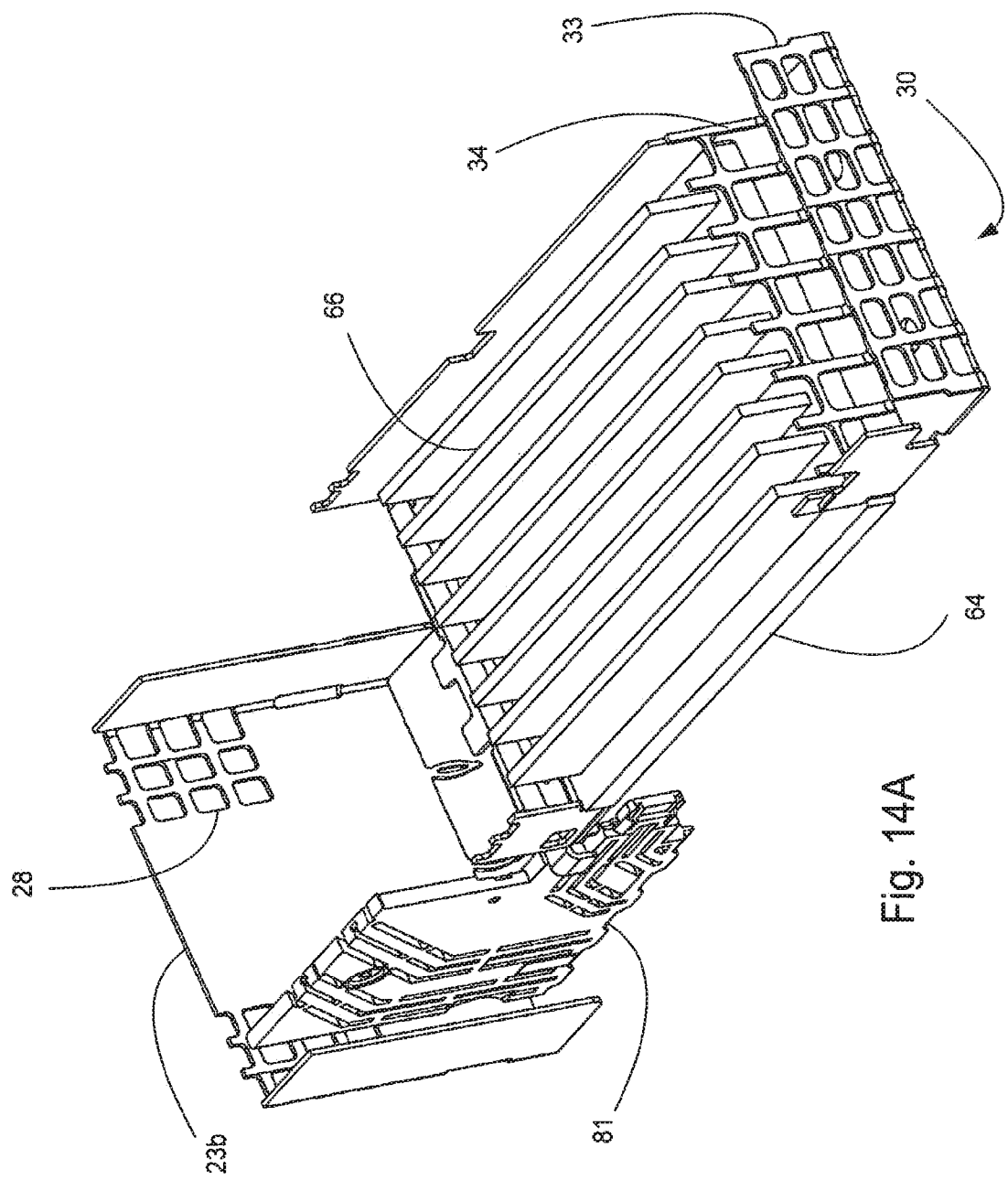
FIG. 14A illustrates a perspective partial simplified view of an embodiment of a cooling channel.
Figure 15:
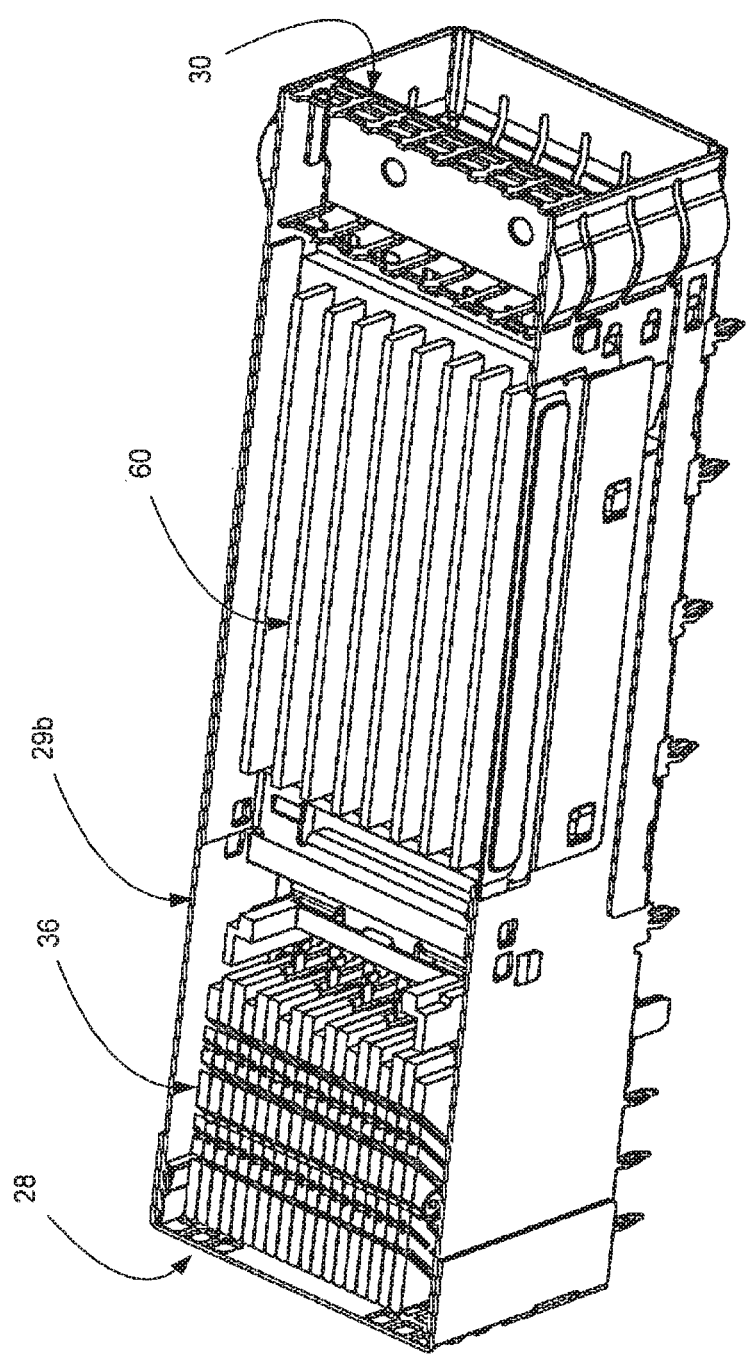
FIG. 15 illustrates a perspective cross sectional view of the embodiment depicted in FIG. 3, taken along line 15-15.
Figure 16:
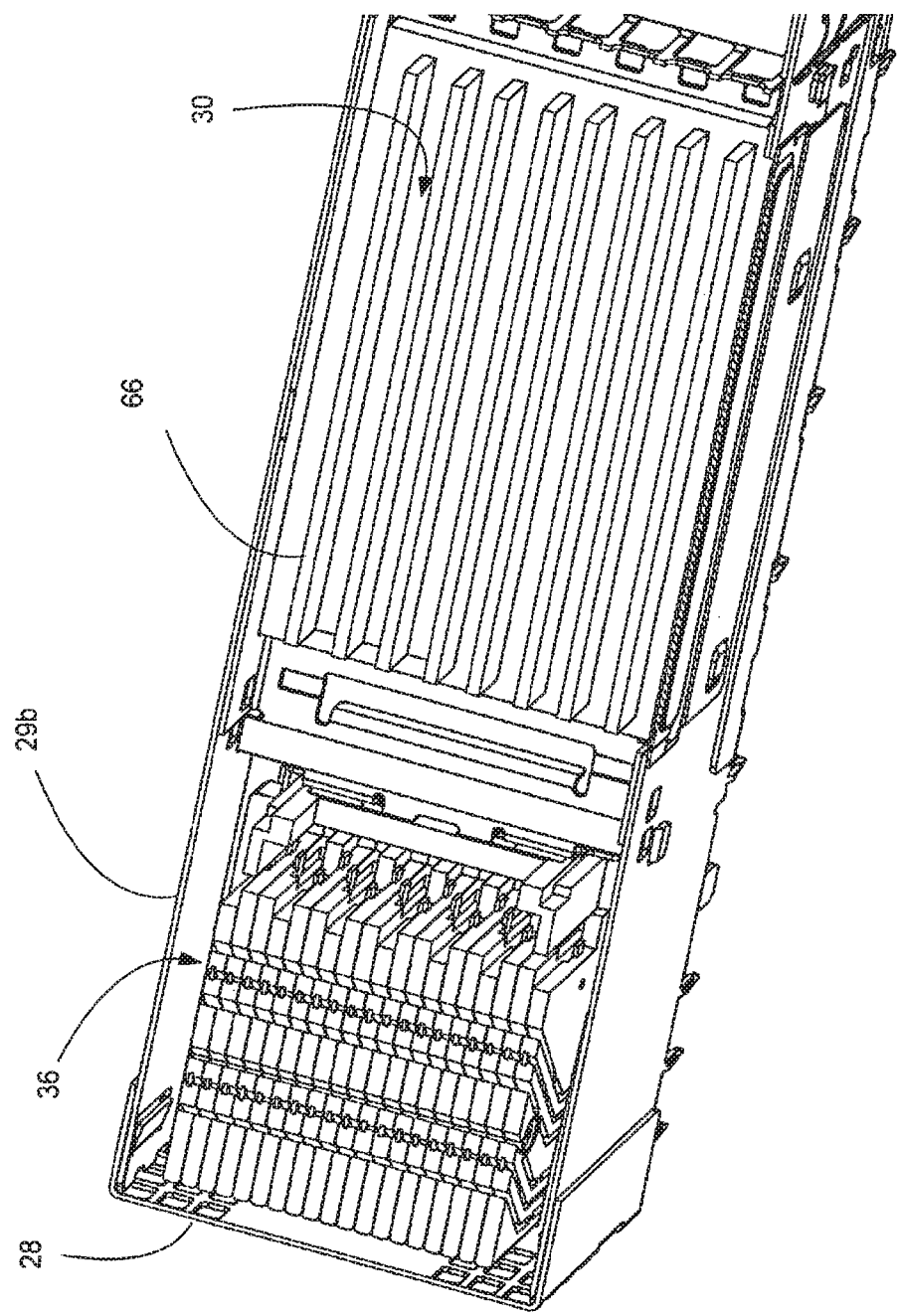
FIG. 16 illustrates another perspective view of the embodiment depicted in FIG. 15.
Figure 17:
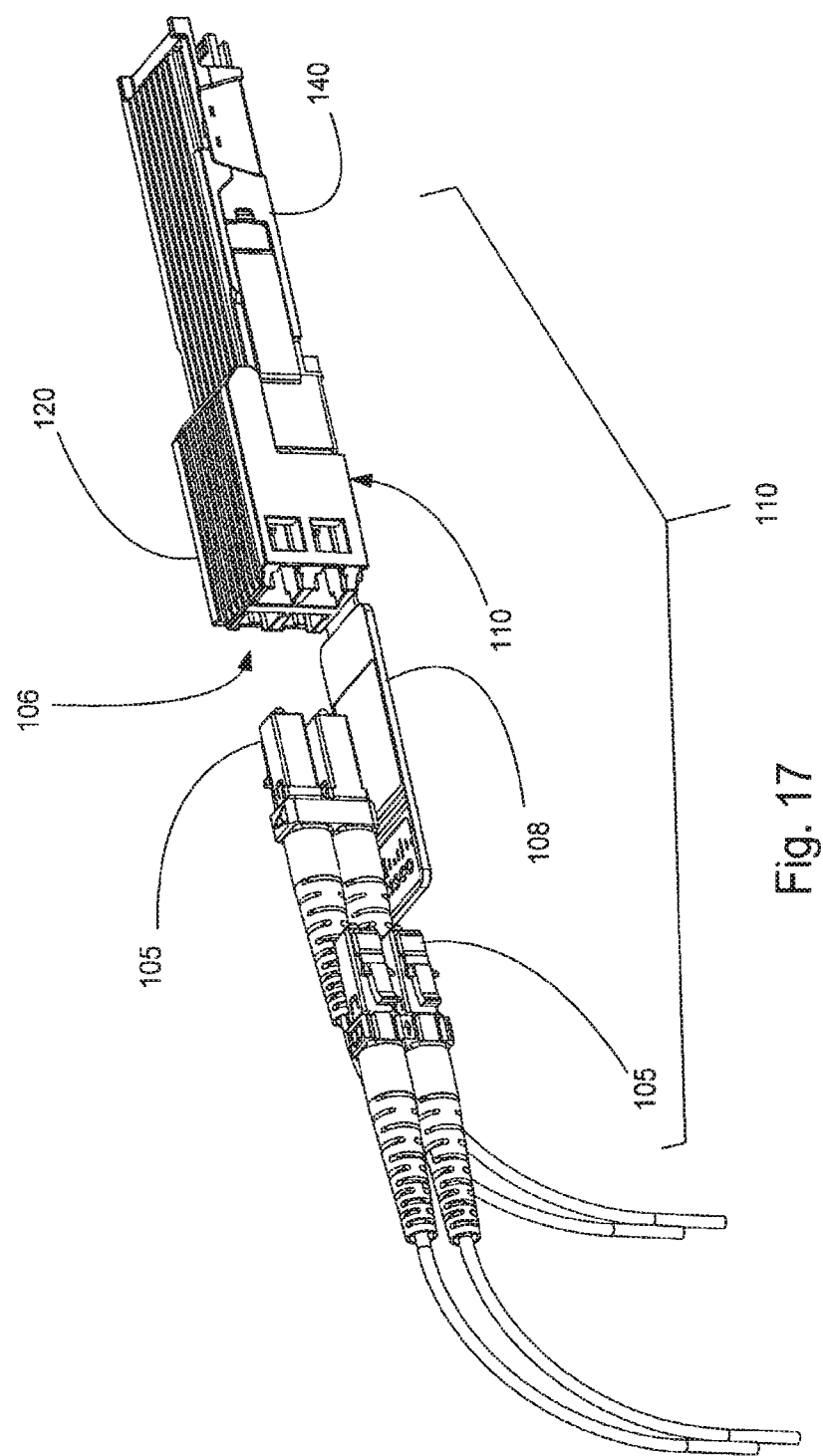
FIG. 17 illustrates a perspective view of an embodiment of a plug module with optical couplers removed.
Figure 18B:
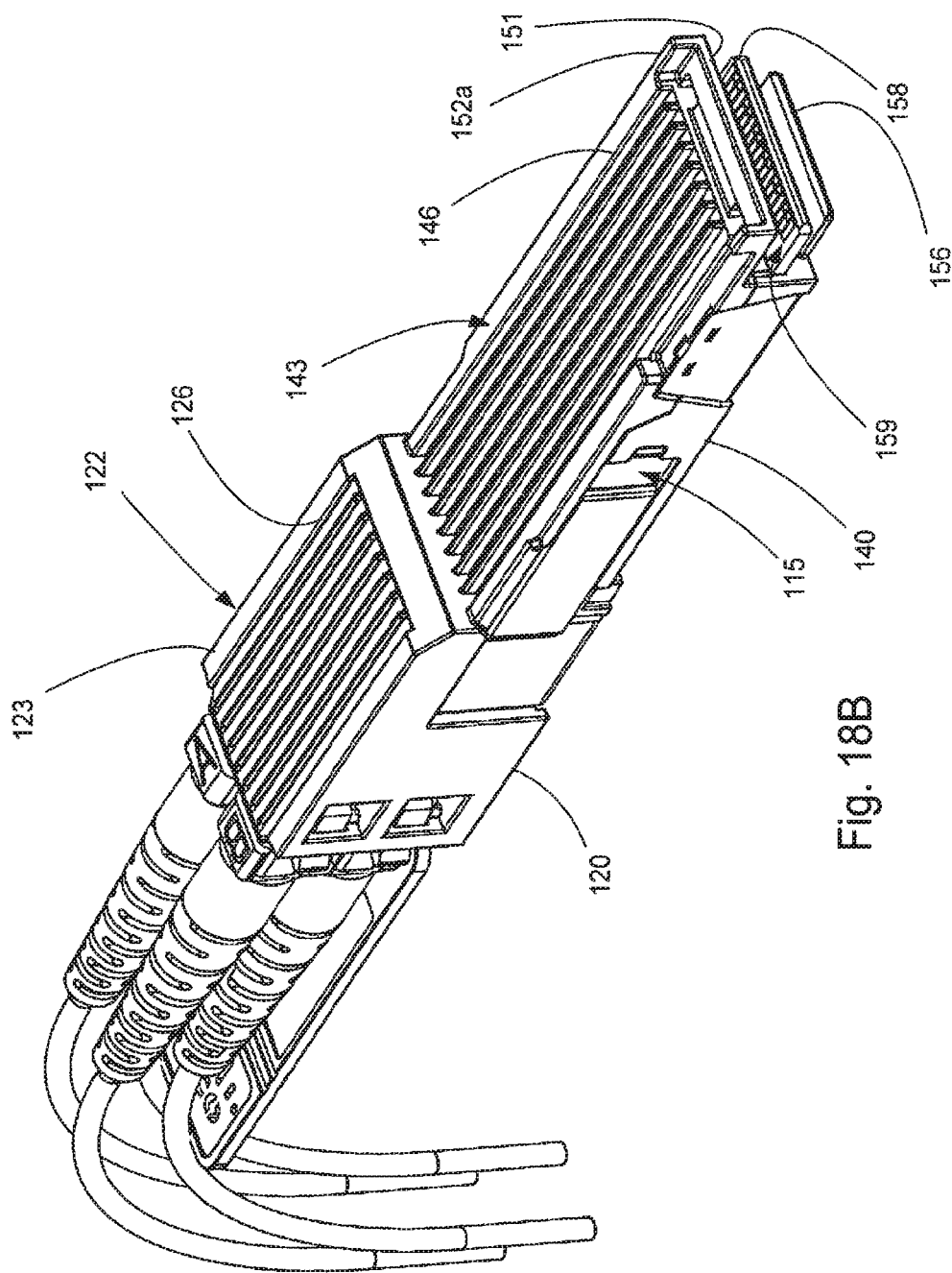
FIG. 18B illustrates another perspective view of the embodiment depicted in FIG. 18A.
Figure 19:
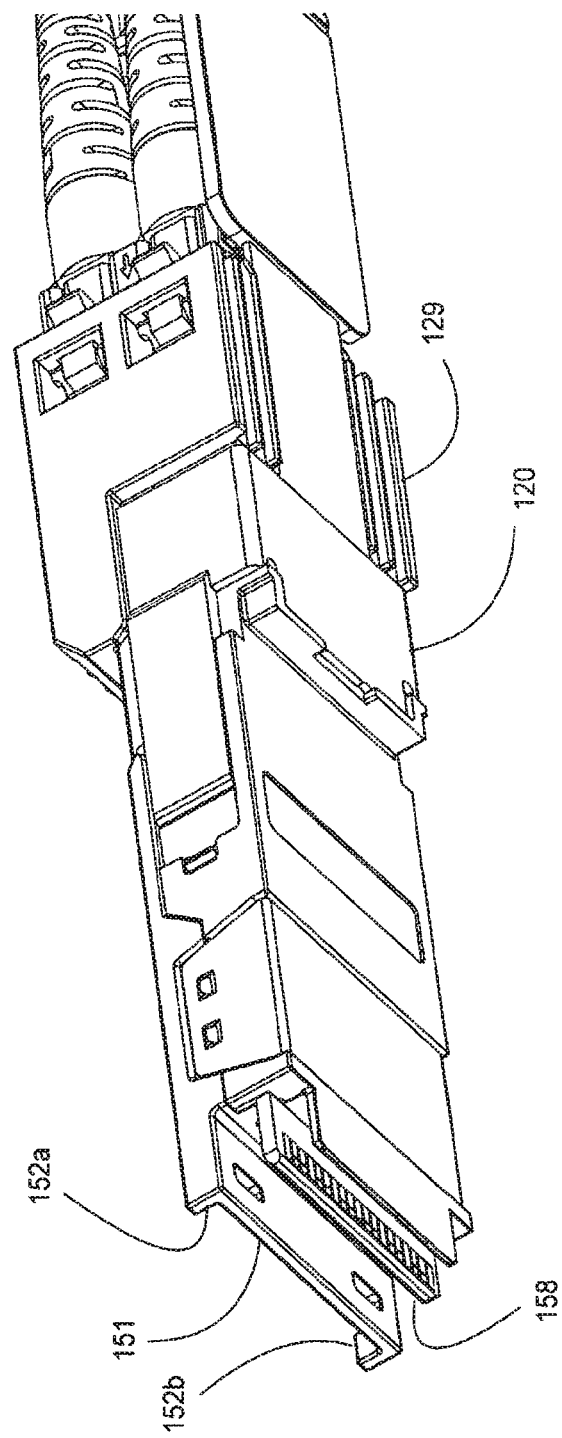
FIG. 19 illustrates another perspective view of the embodiment depicted in FIG. 18A.
Figure 20:
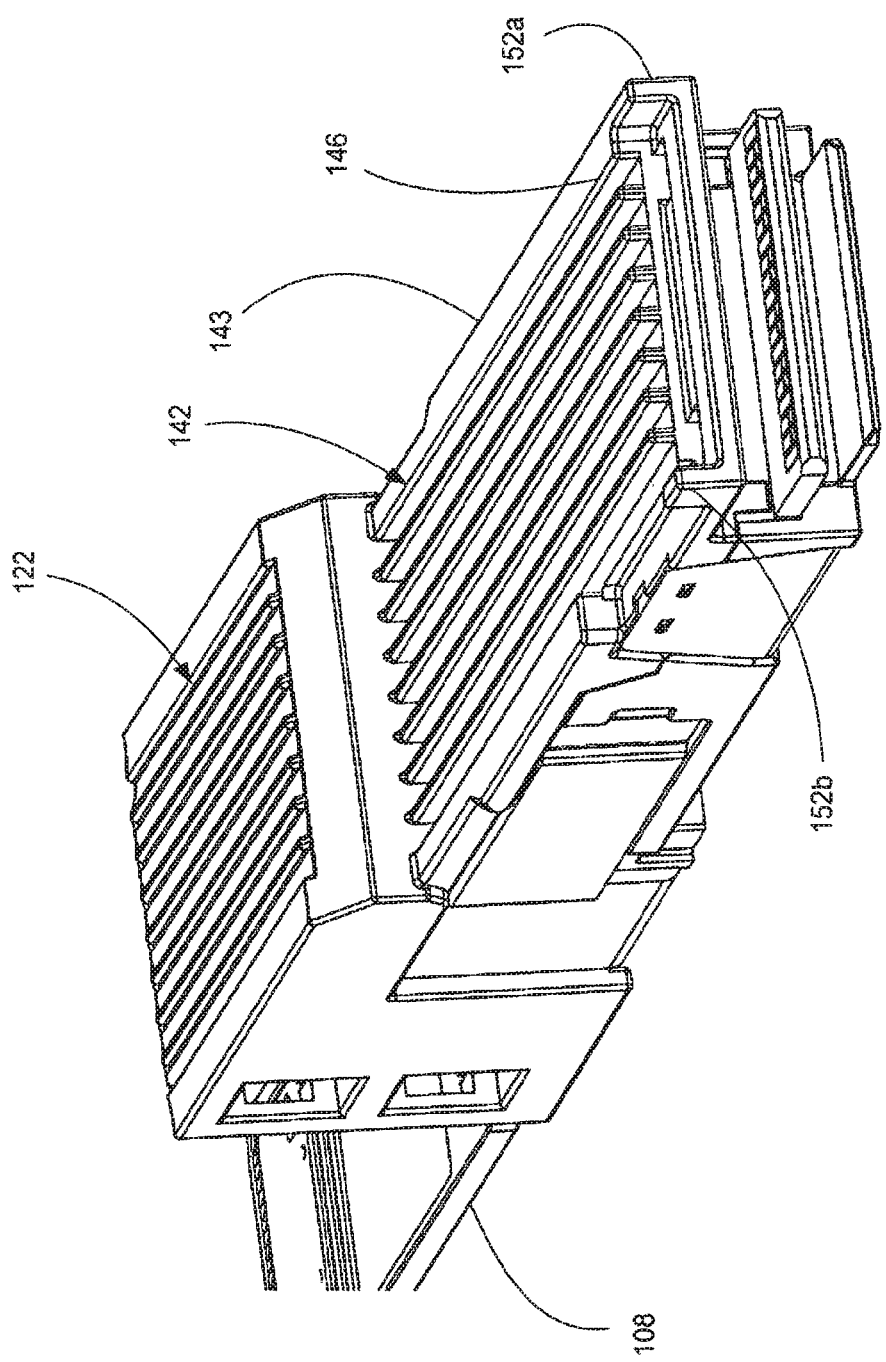
FIG. 20 illustrates a simplified perspective view of the embodiment depicted in FIG. 19.
Figure 21:
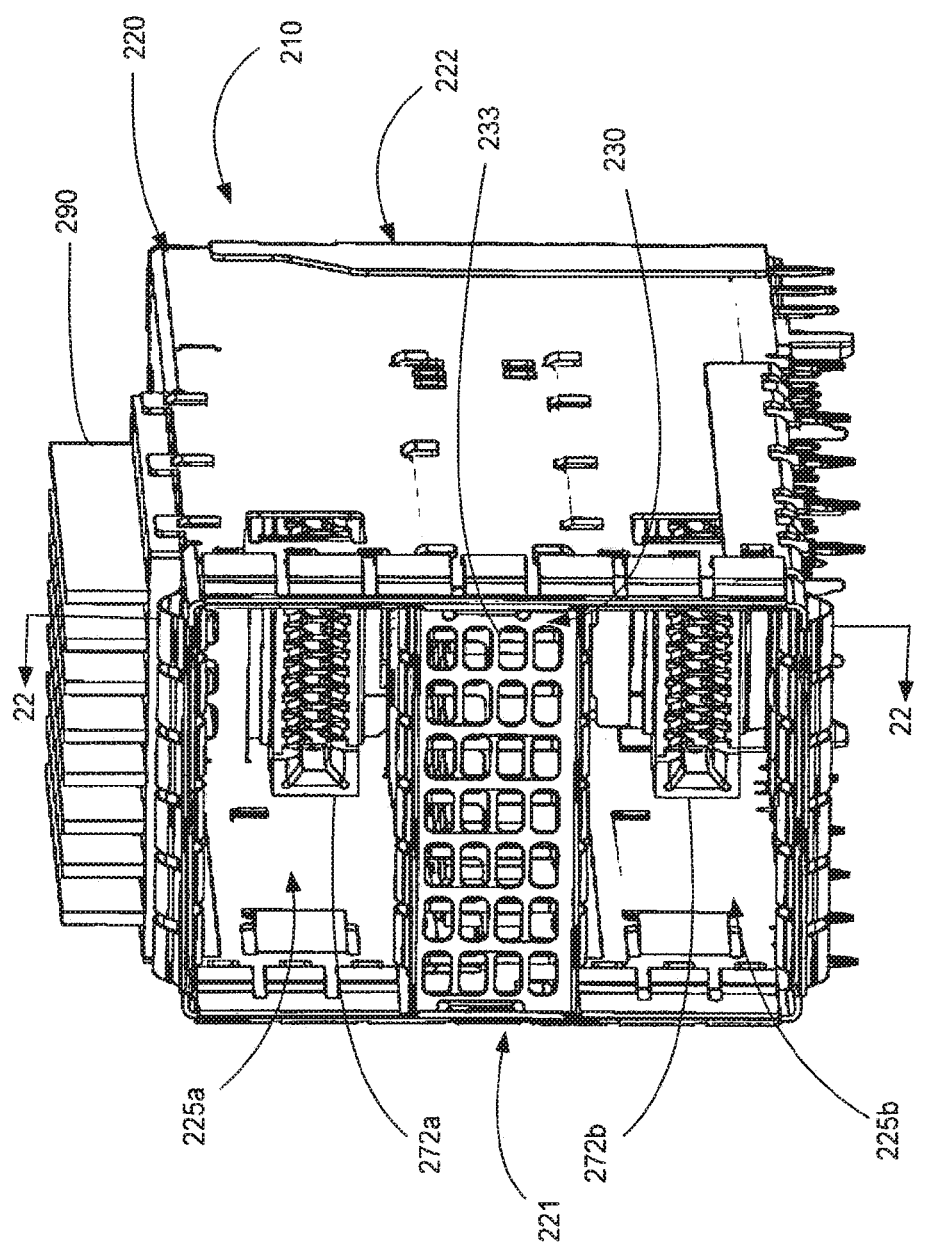
FIG. 21 illustrates a perspective view of another embodiment of a receptacle.
Figure 22:
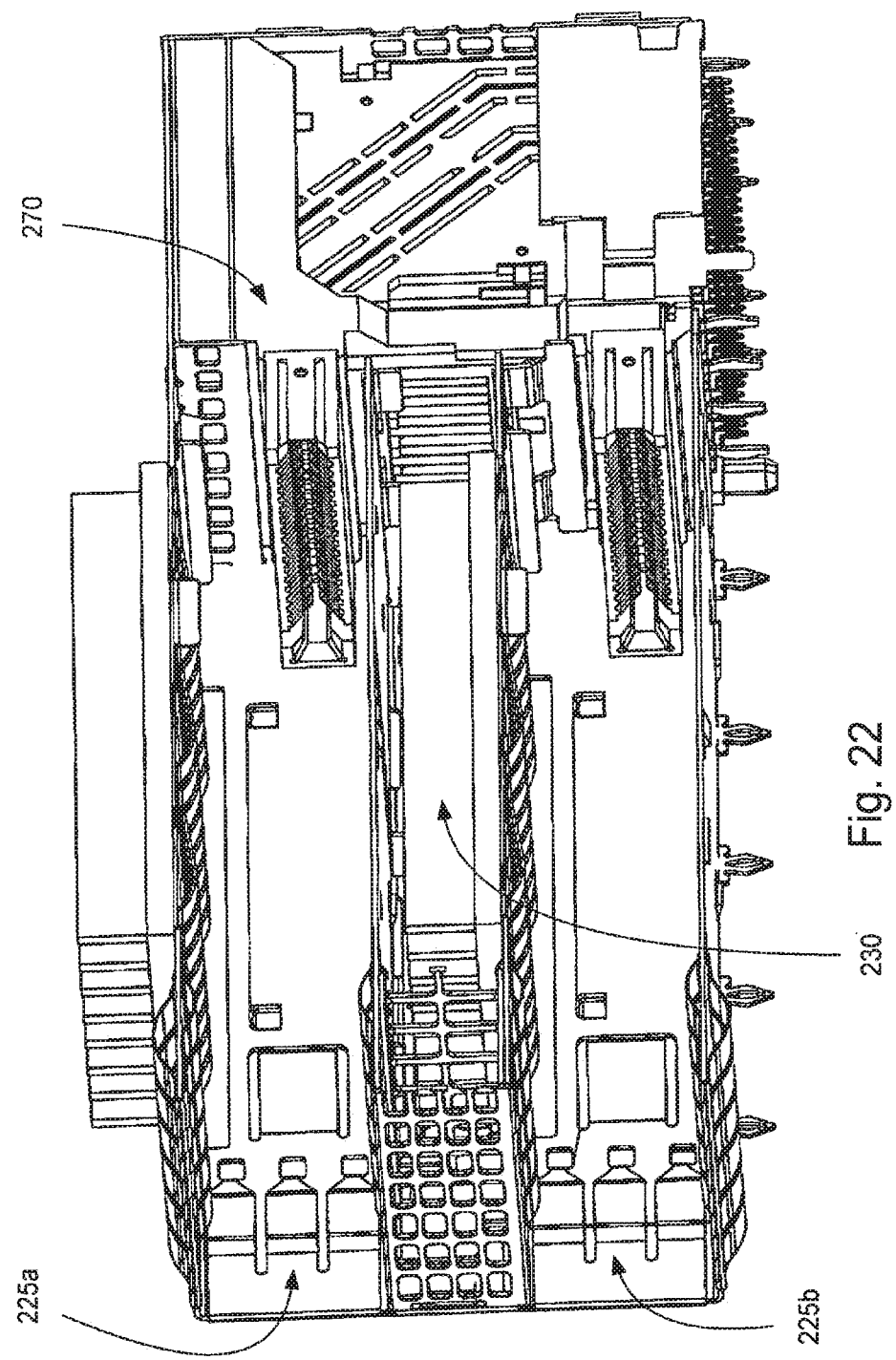
FIG. 22 illustrates a perspective cross sectional view of the embodiment depicted in FIG. 21, taken along line 22-22.
Figure 23:
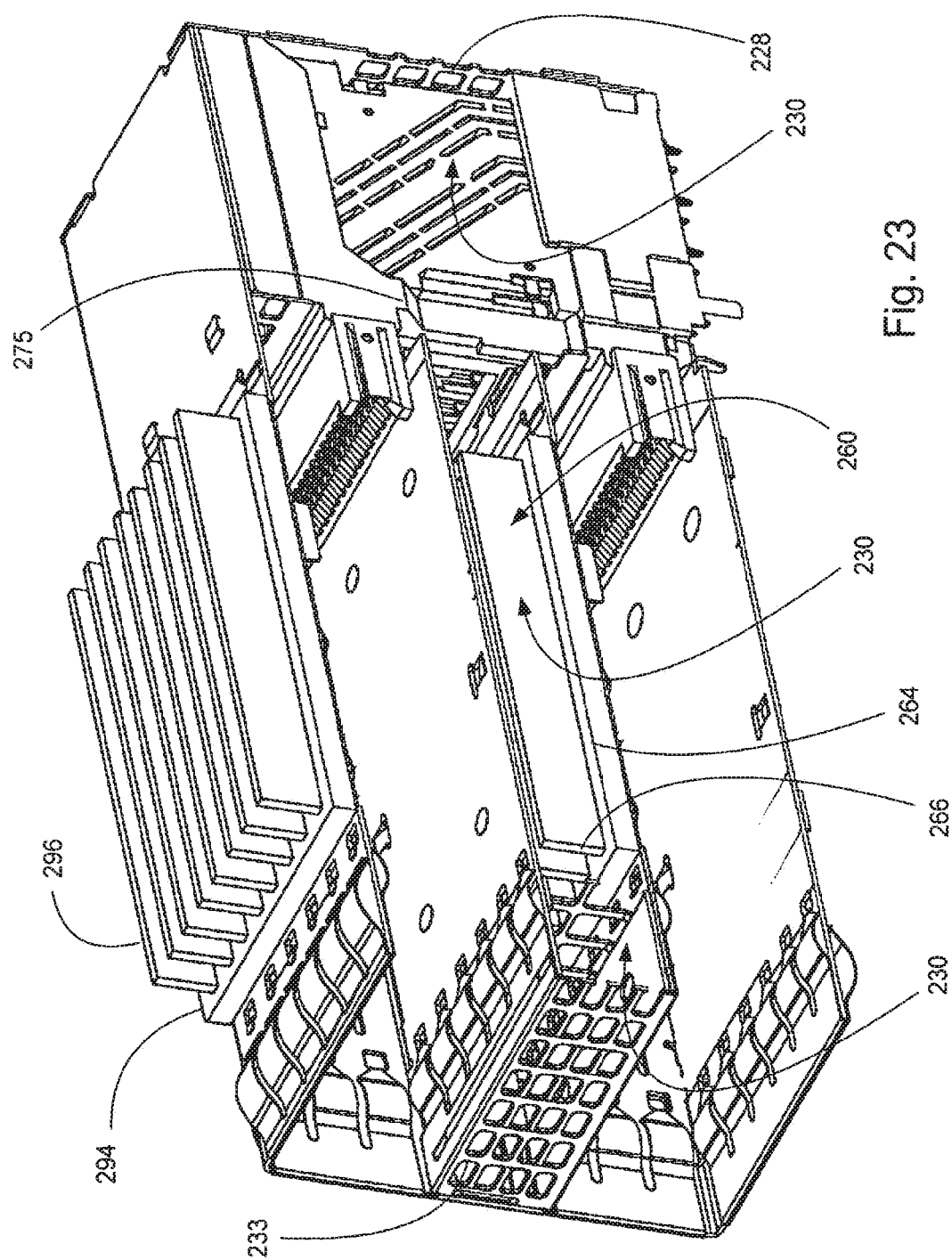
FIG. 23 illustrates another perspective view of the embodiment depicted in FIG. 22.
Figure 24:
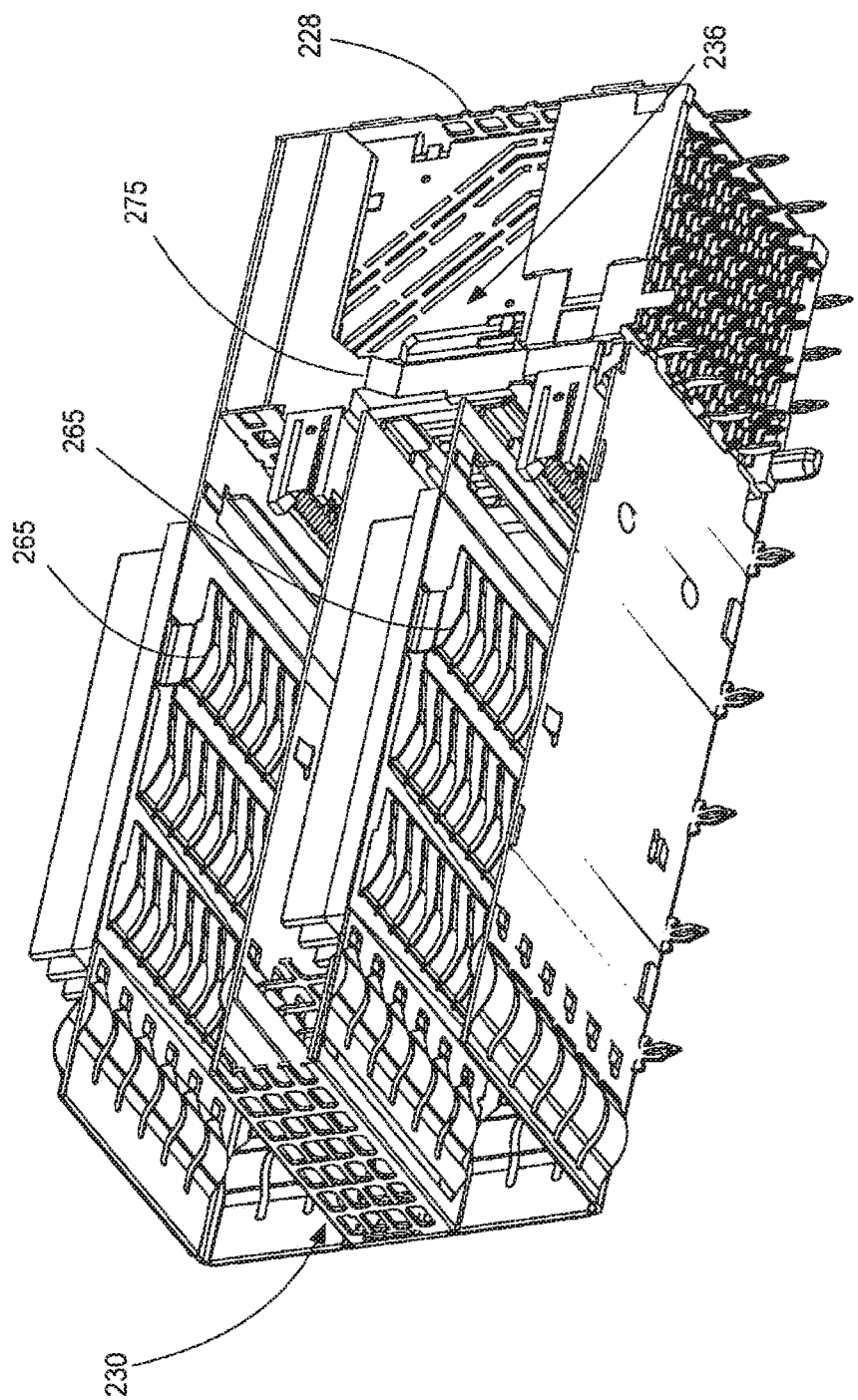
FIG. 24 illustrates another perspective view of the embodiment depicted in FIG. 22.
Figure 25:
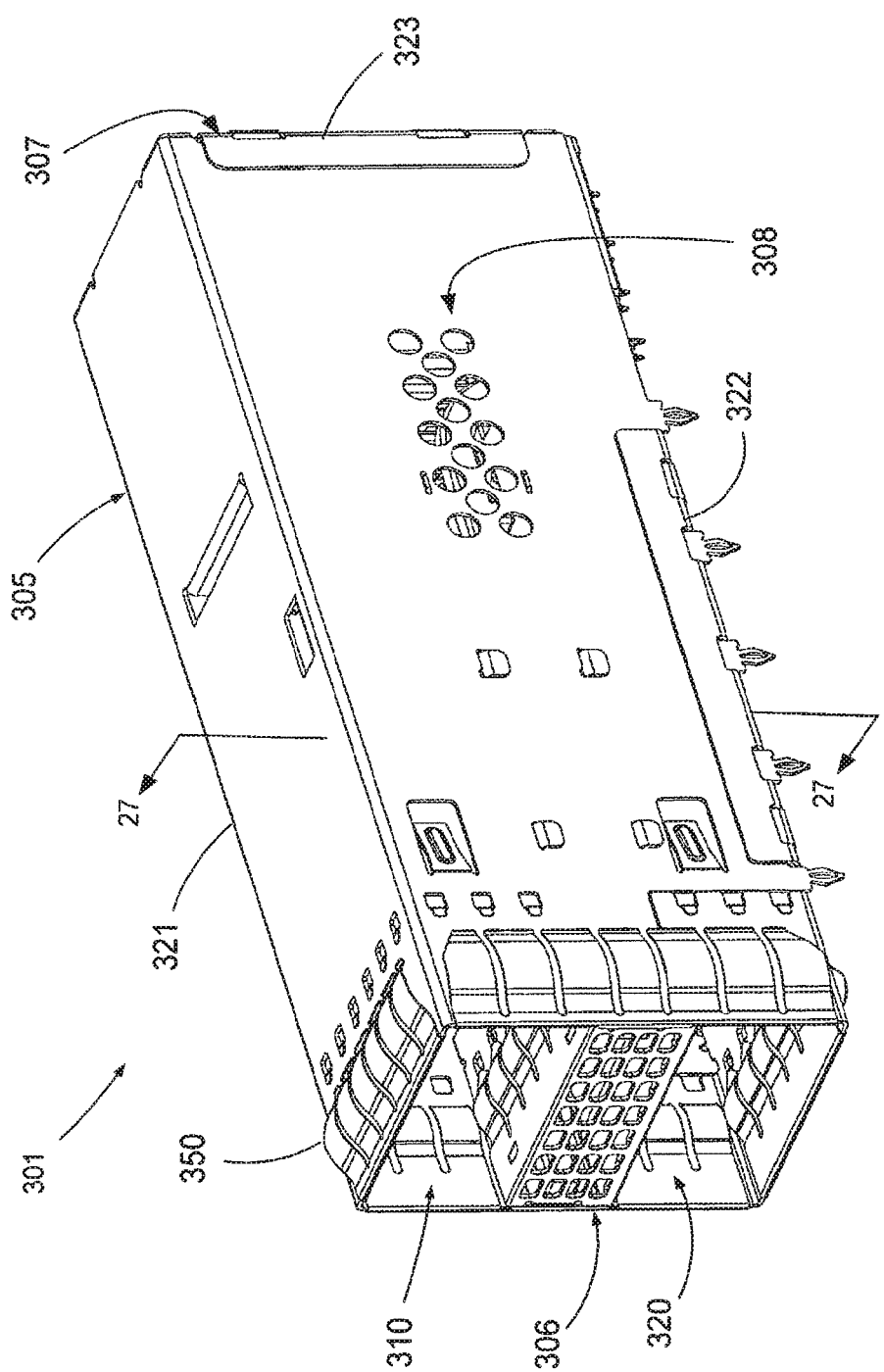
FIG. 25 illustrates a perspective view of another embodiment of a receptacle.
Figure 26:
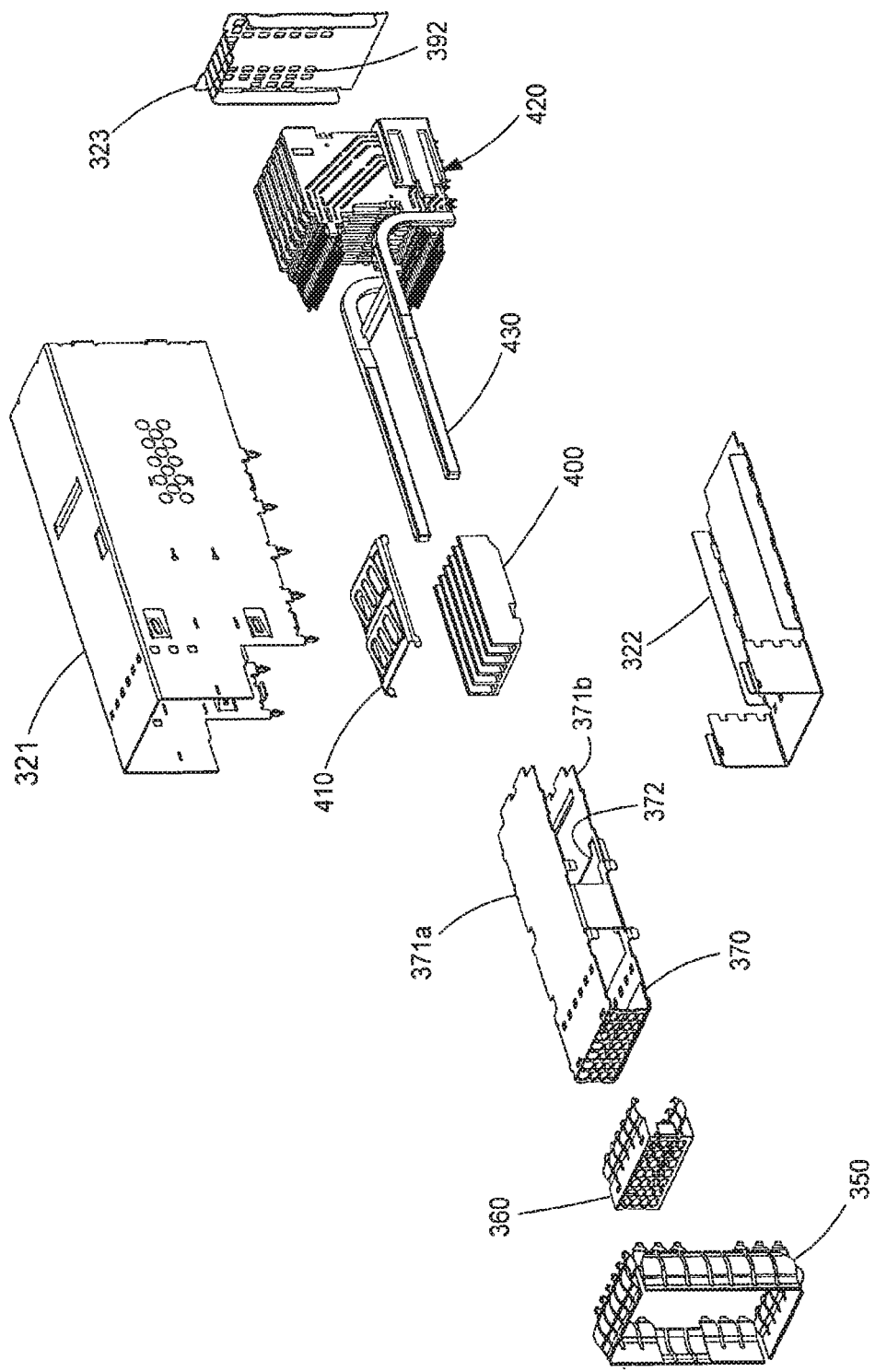
FIG. 26 illustrates a perspective simplified and exploded view of the embodiment depicted in FIG. 25.
Figure 27:
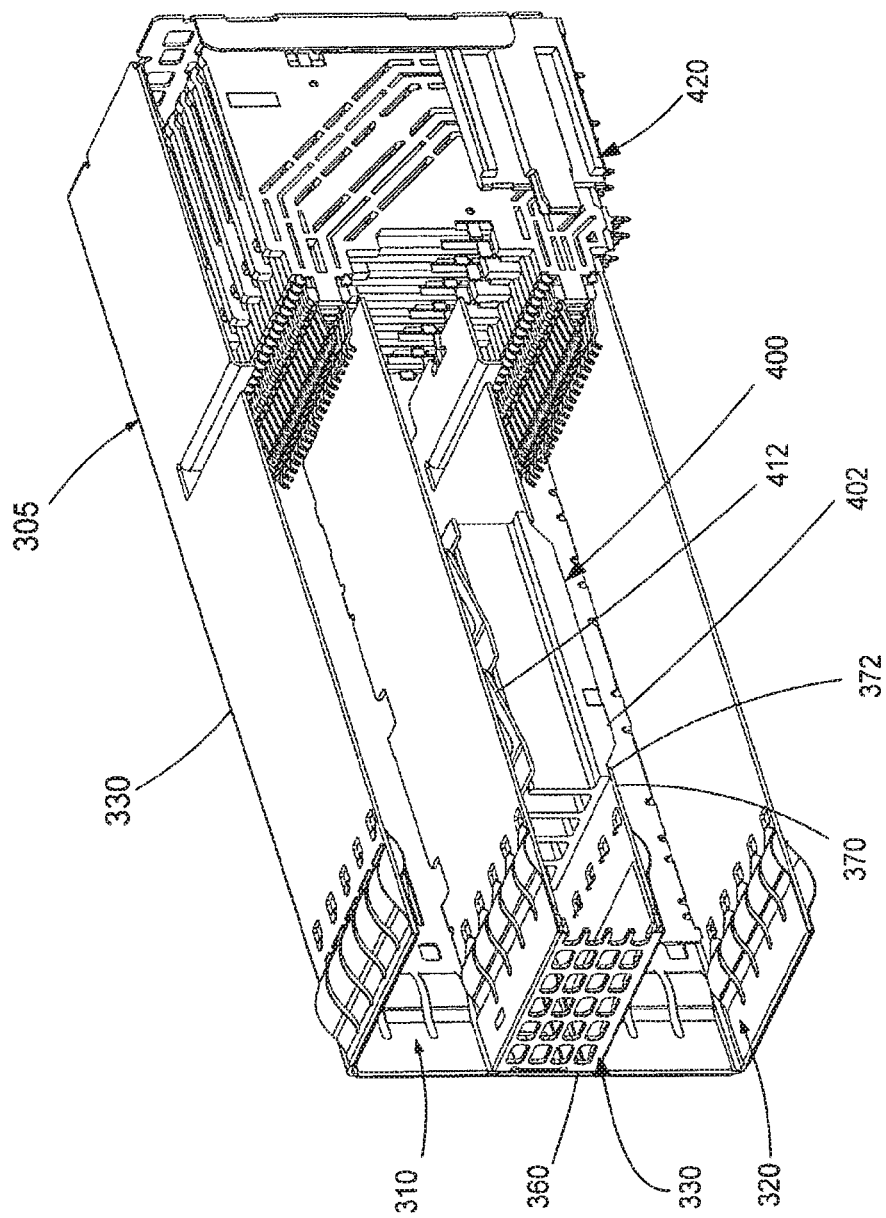
FIG. 27 illustrates a perspective cross sectional view of the embodiment depicted in FIG. 25, taken along line 25-25.
Figure 28:
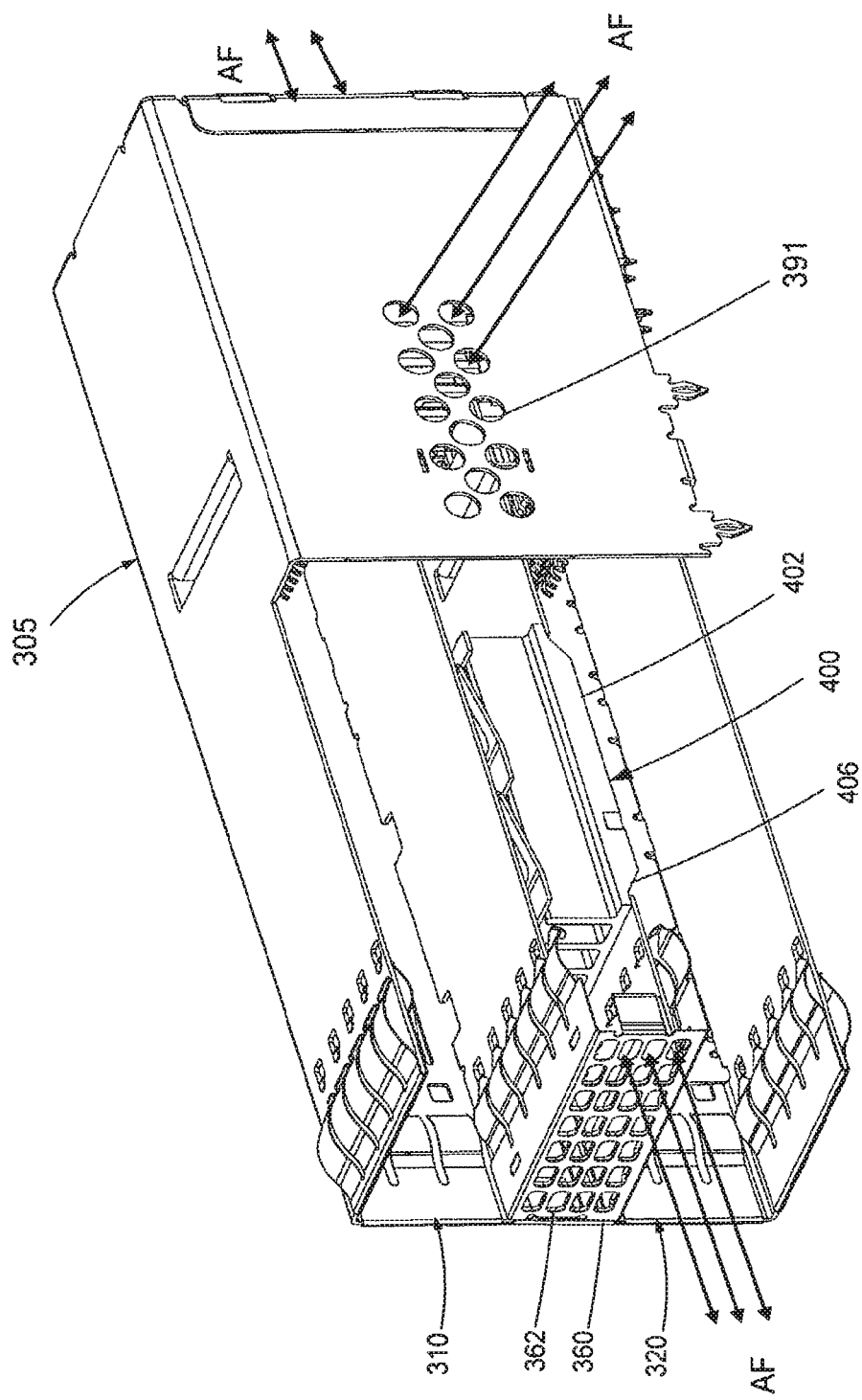
FIG. 28 illustrates a perspective partially cut away view of the embodiment depicted in FIG. 25.
Figure 29:
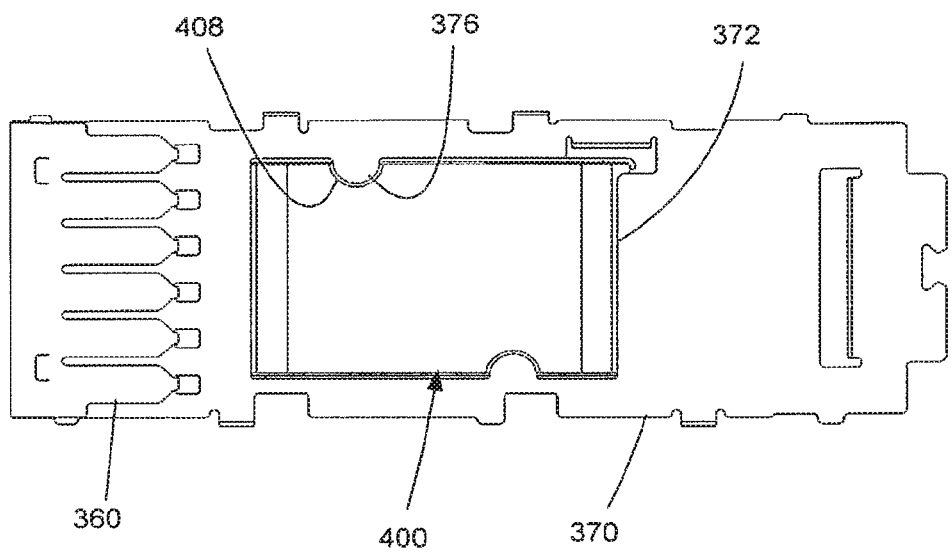
FIG. 29 illustrates a bottom view of an embodiment of an intermediate section.
Figure 30:
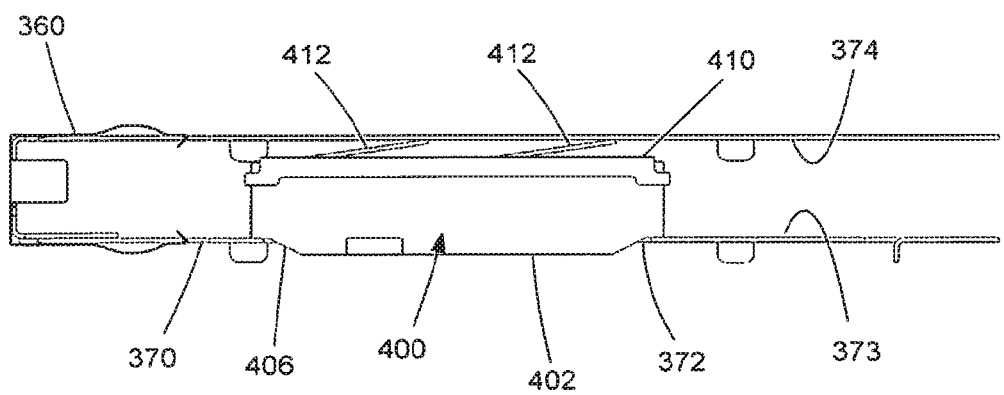
FIG. 30 illustrates an elevated side view of the embodiment depicted in FIG. 29.
Figure 31:
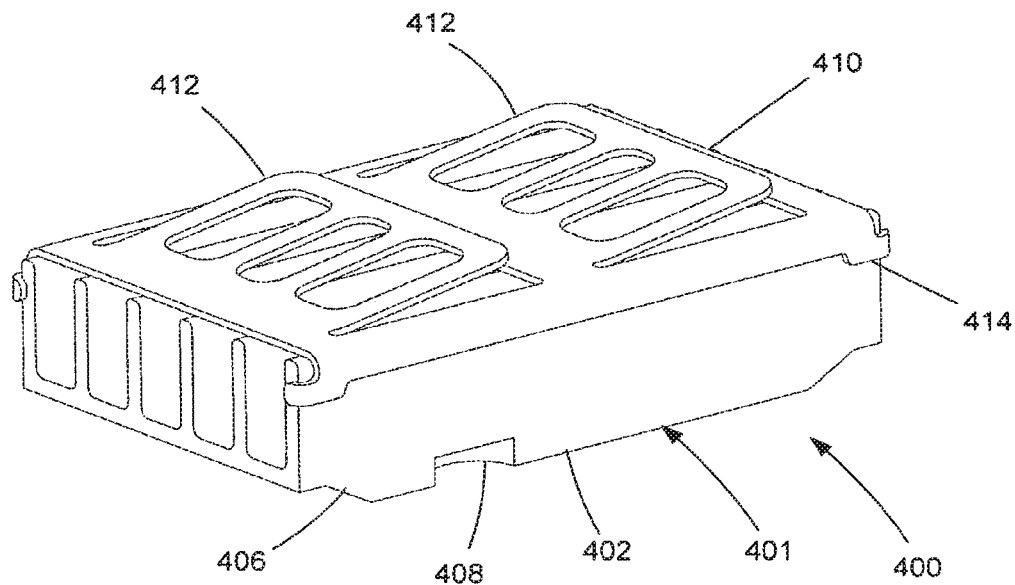
FIG. 31 illustrates a perspective view of an embodiment of a heat sink that can be used in the embodiment depicted in FIG. 25.
Figure 32:
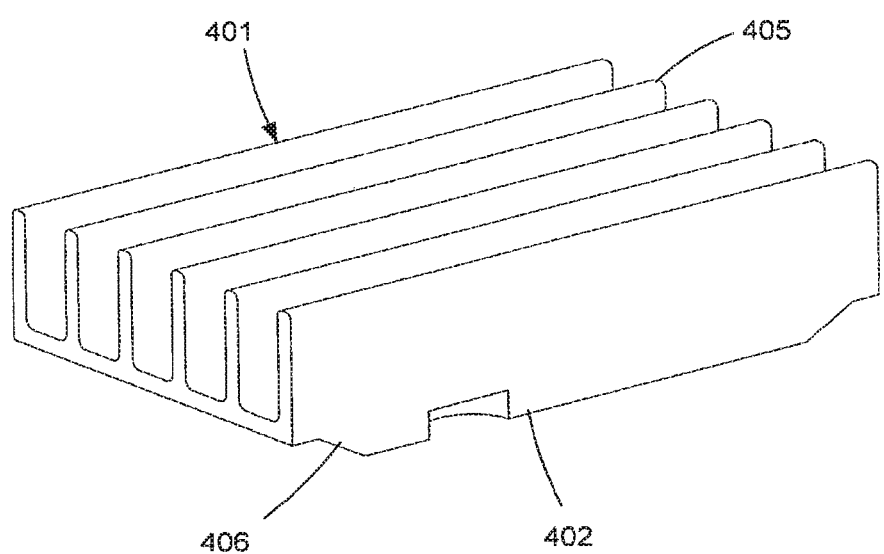
FIG. 32 illustrates a simplified perspective view of the embodiment depicted in FIG. 31.
Figure 33:
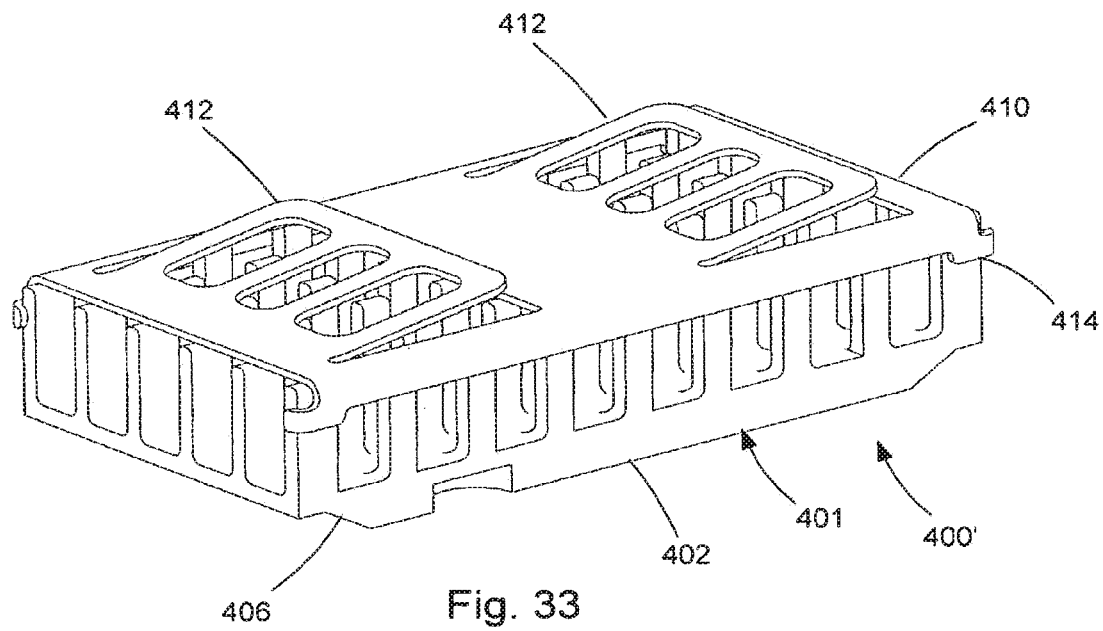
FIG. 33 illustrates a perspective view of another embodiment of a heat sink that can be used in the embodiment depicted in FIG. 25.
Figure 34:
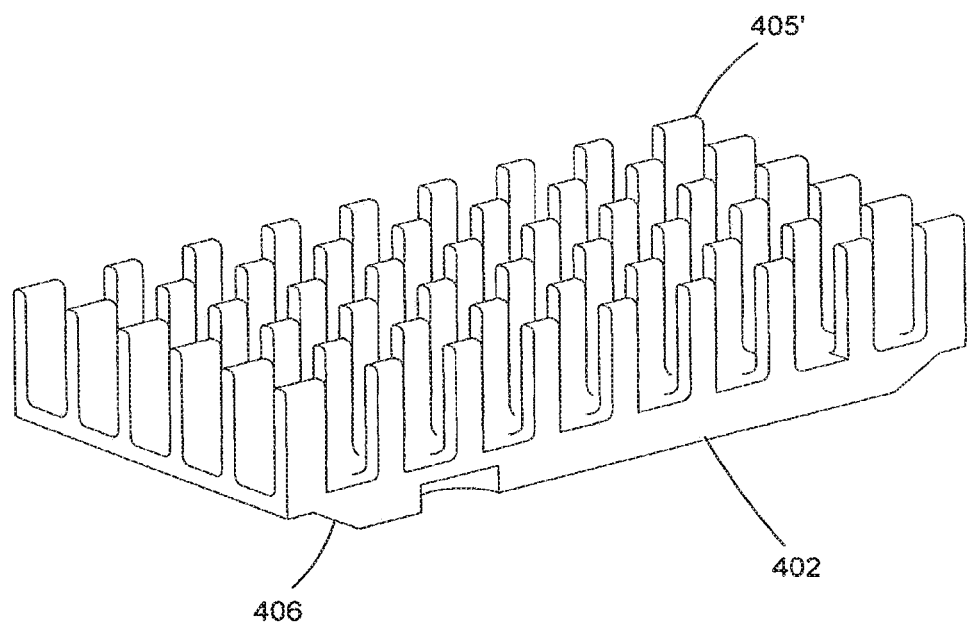
FIG. 34 illustrates a simplified perspective view of the embodiment depicted in FIG. 33.

The detailed description that follows describes exemplary embodiments and is not intended to be limited to the expressly disclosed combination(s). Therefore, unless otherwise noted, features disclosed herein may be combined together or removed as desired to form additional combinations and variations that were not otherwise shown for purposes of brevity.

As can be appreciated from the Figs., some of the embodiments include stacked connectors that allow air flow from a front side to a rear side. Naturally, air flow can also flow from the rear side to the front side. Thus the air flow can be in either direction without limiting the benefits of the disclosed embodiments. In addition, certain embodiments allow for air flow in or out of a side wall of the cage. Air flow through a side wall is suitable for stand-alone receptacles but is less desirable for ganged configurations as the ability to direct air out the side becomes limited with there are multiple ports positioned side by side (particularly the middle ports in a 2×A system where A is 3 or more). For 2×1 or 2×2 configurations, however, configurations that allow for side air flow may be desirable. Thus, the decision to include side air flow will depend on the configuration of the receptacle. To the extent side air flow is used, it is desirable to have the side air flow not exit in the first ⅓ of the cage as that would allow the airflow to pass through the cooling channel without sufficient time to dissipate thermal energy from a transfer member.

Turning to FIGS. 1-16, the depicted embodiment illustrate a receptacle 10 with a cage 20 and housing 70 positioned in the cage 20. The cage 20 defines a top port 25a and a bottom port 25b (e.g., the receptacle is a stacked connector) and the receptacle 10 includes a cooling channel 30 positioned between the top and bottom ports 25a, 25b that extends between a front face 21 and a rear face 22.

The cage 20 can support an EMI gasket 27 and includes a U-section 23a, a rear wall 23b and a bottom wall 23c. The U-section defines side walls 29a, 29b. The housing 70 defines a first mating interface 72a that is aligned with the top port 25a and further defines a second mating interface 72b that is aligned with the bottom port 25b. As depicted the mating interfaces are a single card slot that includes terminals, such as terminals 84a, 84b, that have contacts that extend into the mating interface 72a, 72b in a cantilevered fashion and the terminals are supported by a frame 81. The depicted mating interfaces include terminal grooves 74 that help provide a comb for the contacts that are cantilevered in the mating interface. A mid-wall 87 can be provided to help provide additional EMI protection and if included, can have apertures, such as apertures 88, to allow air to flow past the mid-wall 87. Top channels 77 in the housing 70 can be used to provide additional air flow, as is known, and the air can exit out of top grill 27 in the rear wall 23b.

As depicted, the depicted cooling channel 30 extends between the front face 21 and the rear face 22 and includes a transfer member 60 that provides sufficient surface area so that air flowing through the cooling channel 30 can effectively dissipate thermal energy from cooling channel 30. In an embodiment the transfer member 60 will have a plurality of fins 66 that allow air flowing through the cooling channel to remove thermal energy from the fins 66 via convection. While fins 66 are depicted as have a simple shape, the fins 66 can take any desirable shape. As can be appreciated from the description provided below, such a system is also compatible with a plug module 100 that includes thermal channels 146 that allow for air flow directly over the plug module 100. Thus, the depicted system allows for a variety of configurations that can be optimized so as to provide the desired thermal management capabilities.

The transfer member 60 includes a thermal coupling plate 64 that is provided in or adjacent the bottom port 25b (e.g., the thermal coupling plate is approximate the bottom port). In an embodiment thermal coupling plate 64 and the fins 66 can be formed of a single piece. In an embodiment the thermal coupling plate 64 can include spring fingers 65, as shown, that extend into the bottom port 25b and are configured to engage an inserted plug module to improve the thermal connection to the inserted plug. Alternatively a riding heat sink configuration, such as discussed below, could be used. The thermal coupling plate 64 preferably is connected to the fins 66 such that there is a low thermal resistance between the thermal coupling plate 64 and the fins 66 and preferably the thermal resistance is less than 2.5 K/W. More desirably the thermal resistance is between about 2.0 K/W and about 1.25 K/W. It should be noted that lower thermal resistance than what is discussed above is possible but generally requires the use of materials that are too expensive to justify for the vast majority of applications and thus most applications will be in the depicted range due to cost constraints.

The cooling channel 30 includes a front grill 33 that can have a low resistance to airflow passing across the front grill 33. Thus the cooling channel 30 is in communication with air in front of the connector via the front grill 33. The front grill 33 will typically also needs to provide suitable electromagnetic interference (EMI) protection and thus the size of the openings in the front grill 33 is limited by the desired level of EMI protection.

At the rear face 22 of the receptacle 10 there is a rear wall 23b and the rear wall includes a rear grill 28. The rear grill 28 allows air to flow past the rear wall 23b (either into or out of the connector). As with the front grill 33, the size and amount of openings may be limited by EMI consideration. However, as the rear grill 28 is typically positioned inside of a box that will provide additional EMI protection, the rear grill 28 may be able to satisfy EMI requirements with larger openings. In an embodiment, as depicted, the rear grill 28 may comprise a first rear grill and a second rear grill that are positioned on opposite sides of the rear wall and that are configured to allow air to flow past two opposing sides of the housing.

As can be appreciated, in order to air to flow through the rear grill 28, over the transfer member 60 and then out the front grill 33 (or in the opposite direction if air flow is so configured), the rear grill 28 and the transfer member 60 need to be in communication with each other. In an embodiment the communication is provided by have communication channels 36 that extend alongside the housing 70 and the side walls 29a, 29b. The communication channels 36 can be defined be angled surfaces 75 in the housing 70 and surfaces defined by the outmost wafer 81 of the wafer set 80 (which is supported by the housing 70). It should also be noted that an optional secondary grill 34 can be used to provide additional support for the top channel wall 31a and bottom channel wall 31b. Thus, in an embodiment the cooling channel can extend through the front grill 33, past the transfer member (which is between the top and bottom channel walls 31a, 31b), through the communication channel 36 along the housing 70 and wafer set 80 and then out the rear wall 23b through the rear grill 28.

FIGS. 21-24 illustrate an embodiment of a receptacle 210 that is similar to the receptacle 10. As many of the features are similar, they will not be discussed again for purposes of brevity with the understanding that the features discussed with respect to receptacle 10 also apply to receptacle 210 except where differences are noted. The receptacle 210 includes a cage 220 with a housing 270 positioned therein. The cage 220 has a front face 221 and a rear face 222 and defines a top port 225a aligned with a first mating interface 272a and the cage 220 further defines a bottom port 225b that is aligned with a second mating interface 272b. A cooling channel 230 extends between the top and bottom ports 272a, 272b. The cooling channel 230 extends through a grill 233 at the front face, past a transfer member 260 (typically past fins 266), through communication channel 236 (which is defined in part by the angled surface 275 of the housing 270) and out a rear grill 228.

As can be appreciated receptacle 210 includes the cooling channel 230 that extends between the top port 225a and 225b (e.g., between vertically separated ports as discussed above) and further includes a second transfer member 290 positioned on top of the cage 220. The second transfer member includes a thermal transfer plate 294 that can be positioned in the top port 225a and is connected to fins 296 so as to assist in transfer of thermal energy from an inserted plug/module. The depicted embodiment includes spring fingers 265 to provide thermal communication with an inserted plug module, but as can be appreciated from the discussion below, the spring fingers 265 used on the thermal transfer place 294 can be replaced with base that is used in a conventional riding heat sink design (such as is depicted in U.S. Pat. No. 6,816,3765, which is known in the art and is incorporated herein by reference in its entirety).

As can be appreciated by the following discussion, the embodiment depicted in FIGS. 1-16 and 21-24, as well as the embodiment depicted 25-34, will work well with the plug module depicted in FIGS. 17-20. In addition, conventional plug modules will also work with the receptacle embodiments depicted herein. Thus, the depicted receptacles have the flexibility to allow for different configurations as is appropriate.

Turning to FIGS. 17-20, as depicted a plug module 100 includes a body 110 and an actuator 108 that, when translated along the mating direction in a desired direction, causes a latch 115 to actuate and allows the plug module 110 to be removed from a port. The body 110 includes a main portion 120 and a mating portion 140 and the mating portion 140 is intended to be inserted into a port so that a row of contacts 159 (which can be pads on a substrate 158) engage terminals in a mating interface. The substrate can be a conventional circuit board or other desirable constructions. As can be appreciated, the depicted main portion 120 is larger than the mating portion 140 but other configurations are possible.

Depending on the design of the mating portion 140, a top flange 151 and a bottom flange 156 can be included at a distal end of the mating portion 140. To help distinguish between different modules, orientation flanges 152a, 152b can be provided. The body 110 includes mating apertures 106 that are configured to receive fiber optic connectors 105 (which are used to terminate optical fibers). As can be appreciated, the mating apertures 106 and connectors 105 are optional as it is possible to directly attach the optical fibers to the body 110 (or to provide such a plug module that is configured to active copper applications). In many applications, however, it is considered useful to have the optical fibers configured for separate attachment to the body.

The internal design of the plug module 100 can be as desired, depending on the application. In an embodiment that plug module 100 can be capable, if the plug module is so configured, of converting optical signals to electrical signals in a desirable manner Alternate configurations can boost electrical signals (e.g., an active copper module). As there are a wide range of technologies capable of such functionalities and these technologies are known in the art, no further discussion of these technologies will be provided for purposes of brevity.

The depicted plug module 100 includes a cooling surface 142 that is defined by a top surface 143 that includes channels 146 therein. The channels 146 (which could also be ribs if desired) allow air to flow through the port while the module is inserted into the port, unlike known designs where the module blocks off the port. This allows for some thermal energy to be removed directly from the plug module 100. In an embodiment the channels 146 can be configured to be aligned with spring fingers of a corresponding receptacle so that a connector system can provide efficient thermal transfer from the plug module to the transfer member while still allowing air to flow along the ribs.

The main portion 120 can also include a cooling surface 122 that is defined by a top surface 123 and channels 126. The main portion can further include a secondary cooling surface 129 that can be defined by ribs or channels as desired.

It should be noted that the depicted configuration of the actuator and latch on the plug module is merely an exemplary embodiment and other designs can be used, as desired. For example, the actuator could be positioned on a top side of the plug module. In addition, the configuration of the mating portion is merely one embodiment and other configurations for other receptacle designs would be suitable. Preferred configurations allow a surface of the plug module to be left clear of latches and other features so as to allow for good airflow over that surface but such a design is not required.

Another embodiment of a receptacle 301 is depicted in FIGS. 25-34 and certain features disclosed therein can also be used in the receptacles 10 and 110 (discussed above). The receptacle 301 includes a housing 420 positioned in a cage 305 and is configured to be positioned on a circuit board (not shown) and includes a top port 310 and a bottom port 320 configured to receive mating plug modules. The housing 420, which is partially removed for purposes of illustration, supports wafers in a conventional manner and provides two mating interfaces that are aligned with top and bottom ports 310, 320. A heat sink 400 is disposed within the cage 305 positioned in an intermediate wall section 370. Optional light pipes 430 are also shown disposed in the intermediate wall section 370 and provides an indication to the status of the connection between a module (not shown) and the housing 420.

As depicted, the cage 305 includes a U-section 321, a bottom cover 322 and a rear panel 323 that are constructed to form an enclosure so as to define the ports. An intermediate section 370 is disposed between and helps define the top port 310 and bottom port 320. Electromagnetic interference (EMI) gasket 350 is secured around the front opening and front grill 360 also includes an EMI gasket so that in combination, the EMI gasket 350 and front grill 360 can provide an EMI seal to a mating plug module and when the receptacle 301 is mounted in the box the EMI gasket 350 can engage a bezel (not shown) on the box in a conventional manner.

The intermediate section 370 is disposed in the cage 305 and helps define the upper port 310 and the lower port 320. The intermediate section 370 includes a top channel wall 371a and a bottom channel wall 371b that help define a cooling channel 330 that extends from the front frill 360 to either (or both) a rear grill 392 and/or a side grill 391.

As can be appreciated, a heat sink 400, which is a type of transfer member, includes a body 401 that is formed from a thermally conductive material and the body is positioned in the cooling channel and arranged in an aperture 372 in the bottom channel wall 371b. The body 401 supports a plurality of fins 405 and a mounting bracket 410 is positioned above the fins 405. In operation, air flowing through the cooling channel can pass under the mounting bracket and past the fins 405. The lower portion of the body 401 includes a thermal coupling plate 402. As depicted, the thermal coupling plate 402 includes a tapered edge 406 on two ends.

The mounting bracket 410 includes retaining tabs 414 that align the mounting bracket 410 to the heat sink 400. Biasing elements 412 are formed in the mounting bracket 410 and extend away from the body 401. The heat sink 400 is inserted into the interior space formed in the intermediate section 370. As illustrated, the heat sink 400 is disposed between the top channel wall 371a and the bottom channel wall 371b with the flat surface 402 of the heat sink 400 extending through the aperture 372 formed in the bottom channel wall 371b. In this configuration, the biasing elements 412 press against the top channel wall 371a and urges the heat sink 400 against the lower wall 371b. As depicted, a tab 376 is formed in the lower wall 373 of the intermediate section 370 and is extends into the aperture 372. An alignment notch 408 is formed in the heat sink 400 and corresponds to the tab 376. A second tab 376 is formed on the opposing side of the aperture 372 and is matched with a similar recess 408 formed in the heat sink 400. The tab 376 and recess 408 can be offset across a centerline, as depicted, to help align the heat sink in a symmetrical manner.

As can be appreciated, the thermal coupling plate 402, which is similar in operation to the thermal coupling plate of the embodiment depicted in FIGS. 1-16, extends through the bottom channel wall 371b and extends into the port 320. The optional side grill 391 formed in the side of the cage allows air to flow in and out of the cage assembly 305. Thus, air AF can flow through the front grill, over the fins 405 and then out either (or both) the rear grill 392 and/or the side grill 391. As a result, air flow can be between the front and the side or between the front and the rear. In addition, with the appropriately sealed system, air could flow between the front and the combination of the rear and side (although this would work better for stacked connectors that are not in a ganged configuration).

The heat sink 400 has certain similarities to heat sinks that are typically known as a riding heat sink but prior uses did not contemplate (and the structure was not compatible with) the internal configuration depicted herein. In operation, a plug module (such as but not limited to the plug module in FIGS. 17-20) is inserted into the lower port 320. The top surface of the inserted plug module abuts the tapered edge 406 and causes the heat sink 400 to displace upward, deflecting the biasing elements 412 and the deflected biasing element 412 correspondingly provides a downward force that helps the heat sink maintain contact between the plug module and the heat sink 400. This allows for improved thermal conductivity between the inserted plug module and the heat sink and allows thermal energy to be conducted away from the inserted module. Consequentially, the heat energy generated in the plug module can pass to the heat sink and into the fins. Air AF flows through the cage and through the cooling channels 330 and convects heat away from the fins. This allows the heat energy generated by the plug module to be dissipated from the receptacle.

Figure 35:
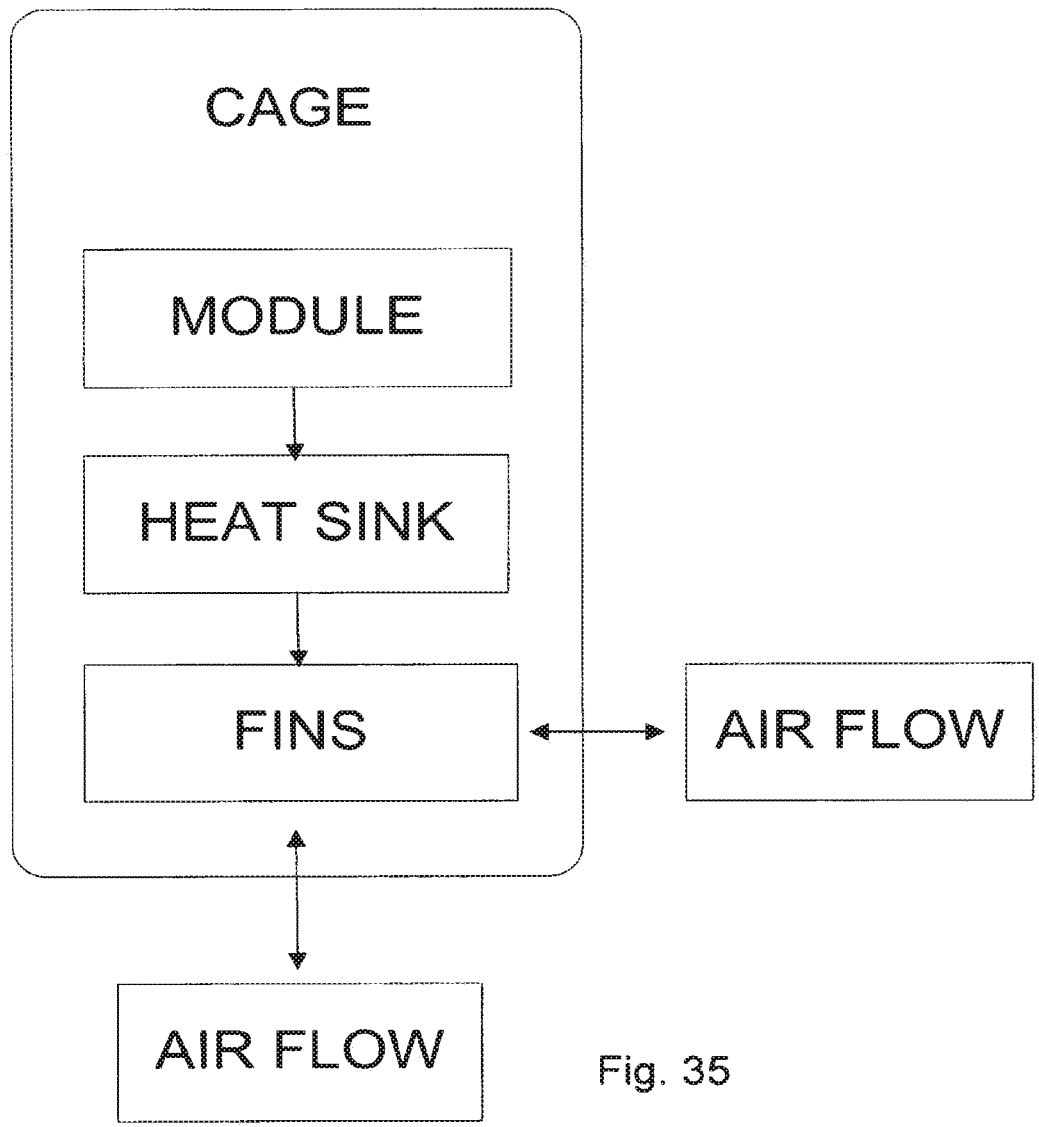
FIG. 35 illustrates a schematic diagram of air flow through a receptacle.

To illustrate the system's operation, a schematic of the thermal flow is depicted in FIG. 35. As can be appreciated, air flows into the cage system along a first face and then flows out of the cage along a second face, taking away some amount of thermal energy.

If not otherwise prevented, upon insertion of a module into the bottom port the front of the heat sink 400 would be engaged first and this could cause the front portion of the heat sink 400 to begin to be displaced while the rear portion of the heat sink was still engaging the lower wall 373. In such an occurrence the heat sink 400 could become wedged and not move smoothly, undesirably increasing insertion force. To provide for improved insertion, the tabs 376 and recesses 408 previously described provide an aligning feature that helps keep the heat sink 400 from canting and therefore reduce the chance of it becoming wedged. Additionally, the tabs 376 and recesses 408 help keep the heat sink in position and help reduce movement forward or backward when a mating plug connector is inserted or removed from the bottom port 320.

In an alternative embodiment, a heat sink 400' includes a body 401 that is similar to heat sink 400 but may include fins 405' that are provided in a different configuration. As can be readily appreciated, numerous other fin configurations are also possible. Thus, in certain embodiments the air flow is not restricted along particular pathways but instead is directed into the cooling channel 330 in a manner that encourages turbulent air flow over the fins 405', potentially improving performance. As can be appreciated, the fins 405' in heat sink 400' provide additional surface area that can be exposed to air flowing through the cooling channel 330.

While various embodiments are contemplated, it should be noted that the depicted configuration of the cooling channel allows for dissipation of thermal energy from an inserted module to the environment. Specifically, air enters the cage through one face and exits the cage through at least one other face and the air flows through a cooling channel over a transfer member before exiting so that heat energy transferred to fins can be transferred to the air and directed out of the receptacle. The air flow thorough the cage can be forced by a fan defining an intake and/or an exhaust.

The disclosure provided herein describes features in terms of preferred and exemplary embodiments thereof. Numerous other embodiments, modifications and variations within the scope and spirit of the appended claims will occur to persons of ordinary skill in the art from a review of this disclosure.

We claim:

1. A receptacle, comprising:
   a wafer set defining a first mating interface and a second mating interface, the wafer set supporting a plurality of terminals, the terminals having tails for mounting to a circuit board and contacts configured to engage a mating connector, the contacts extending to a first mating interface and a second mating interface;
   a cage having a front face and a rear face, the cage defining a top port and a bottom port, the top port aligned with the first mating interface and the bottom port aligned with the second mating interface, the cage further including a cooling channel positioned between the top and bottom port, the cooling channel having a wall adjacent the top port, the cage having at least one of a rear grill on the rear face or a side grill and having a front grill on the front face;
   a cooling member having a thermal coupling plate and a transfer member, the thermal coupling plate provided proximate the bottom port, the thermal coupling plate thermally coupled to the transfer member positioned in the cooling channel, wherein the front grill is in communication with the at least one rear grill or side grill via the cooling channel and the thermal coupling plate is configured to conduct thermal energy from an inserted plug module to the transfer member, wherein the transfer member is a plurality of fins; and
   a biasing element positioned between the cooling channel wall adjacent the top port and the cooling member, the biasing element configured to urge the cooling member toward the bottom port.

2. The receptacle of claim 1, further comprising a housing supporting the wafer set and a communication channel provided on a side of the housing, the communication channel allowing the rear grill to be in communication with the cooling channel.

3. The receptacle of claim 1, wherein the thermal coupling plate is configured to press against a top surface of a mating plug connector.

4. The receptacle of claim 1, wherein the thermal coupling plate includes a plurality of spring fingers configured to mate with a top surface of a mating plug connector.

5. The receptacle of claim 1, wherein the biasing element is configured to urge the cooling member against a top surface of a mating plug connector.

6. The receptacle of claim 1, wherein the biasing element comprises a plurality of spring fingers.

7. The receptacle of claim 1, the thermal coupling plate and the transfer member being integrated as a single component.

8. A plug module, comprising:
   a body having a main portion and a mating portion, the mating portion having a first flange extending toward a distal end and a second flange extending toward the distal end;
   a plurality of contacts positioned near the distal end of the mating portion and supported by a substrate having a top surface and a bottom surface, the contacts being arranged so as to be at least partially shielded by the first flange, the first flange being positioned above the top surface of the substrate and the second flange being positioned below the bottom surface of the substrate with a surface facing the bottom surface of the substrate, the first flange having a surface facing the top surface of the substrate that has a greater surface area than the surface of the second flange facing the bottom surface of the substrate;
   a latch provided on the mating portion; and
   an actuator supported by the main portion, the actuator configured to actuate the latch.

9. The plug module of claim 8, wherein the substrate is a circuit board.

10. The plug module of claim 8, wherein the main portion is larger than the mating portion.

11. The plug module of claim 8, wherein at least one optical fiber is connected to the body.

* * * * *